US009253804B2

(12) United States Patent
Amidon et al.

(10) Patent No.: US 9,253,804 B2
(45) Date of Patent: Feb. 2, 2016

(54) SYSTEMS AND METHODS FOR ENABLING RECIPIENT CONTROL OF COMMUNICATIONS

(75) Inventors: Christopher M. Amidon, Apex, NC (US); Scott Curtis, Durham, NC (US); Ravi Katpelly, Cary, NC (US)

(73) Assignee: MODENA ENTERPRISES, LLC, Wilmington, DE (US)

( * ) Notice: Subject to any disclaimer, the term of this patent is extended or adjusted under 35 U.S.C. 154(b) by 877 days.

(21) Appl. No.: 13/039,478

(22) Filed: Mar. 3, 2011

(65) Prior Publication Data
US 2012/0134321 A1 May 31, 2012

Related U.S. Application Data

(60) Provisional application No. 61/309,899, filed on Mar. 3, 2010.

(51) Int. Cl.
*H04W 76/02* (2009.01)
*H04M 3/42* (2006.01)
*H04M 7/00* (2006.01)
*H04L 29/08* (2006.01)

(52) U.S. Cl.
CPC .............. *H04W 76/02* (2013.01); *H04L 67/24* (2013.01); *H04M 3/42093* (2013.01); *H04M 3/42365* (2013.01); *H04M 3/42374* (2013.01); H04L 67/14 (2013.01); H04L 67/306 (2013.01); H04M 3/42059 (2013.01); H04M 7/006 (2013.01)

(58) Field of Classification Search
CPC ............... H04M 3/42195; H04M 3/42374; H04M 3/42059; H04M 3/42093; H04M 3/42365; H04M 2203/2072; H04L 69/329; H04L 67/24; H04L 67/14
See application file for complete search history.

(56) References Cited

U.S. PATENT DOCUMENTS 5,550,907 A    8/1996   Carlsen
5,565,909 A   10/1996   Thibadeau et al.
5,577,041 A   11/1996   Sharma et al.

(Continued)

FOREIGN PATENT DOCUMENTS

EP    1923830 A2    5/2008
JP    2004118853 A  4/2004

(Continued)

OTHER PUBLICATIONS

Audet, F. et al., "Extended Refer," Slides from International Engineering Task Force (IETF), 59th Meeting, Feb. 29-Mar. 5, 2004, Seoul, South Korea, found at <http://www.softarmor.com/sipping/meets/ietf59/slides/>, 13 pages.

(Continued)

*Primary Examiner* — Faruk Hamza
*Assistant Examiner* — Axia Guadalupe-Cruz
(74) *Attorney, Agent, or Firm* — Olive Law Group, PLLC

(57) ABSTRACT

Disclosed herein are methods and systems for enabling recipient control of communications. According to an aspect, a method may include receiving a communication request identifying a proposed timing of a communication and/or a proposed communication channel for the communication. The method may also include receiving selection of an actual timing and/or an actual communication channel for the communication. Further, the method may include initiating the communication based on the selection.

33 Claims, 13 Drawing Sheets

(56) References Cited

U.S. PATENT DOCUMENTS

| | | | |
|---|---|---|---|
| 5,742,905 A * | 4/1998 | Pepe et al. ............... 455/461 |
| 6,011,975 A | 1/2000 | Emery et al. |
| 6,278,704 B1 | 8/2001 | Creamer et al. |
| 6,314,296 B1 | 11/2001 | Hamada et al. |
| 6,366,856 B1 | 4/2002 | Johnson |
| 6,724,872 B1 | 4/2004 | Moore et al. |
| 6,978,003 B1 | 12/2005 | Sylvain |
| 6,992,584 B2 | 1/2006 | Dooley et al. |
| 7,043,362 B2 | 5/2006 | Krull et al. |
| 7,046,994 B1 | 5/2006 | Padawer et al. |
| 7,047,019 B1 | 5/2006 | Cox et al. |
| 7,054,621 B2 | 5/2006 | Kennedy |
| 7,068,768 B2 | 6/2006 | Barnes |
| 7,085,578 B2 | 8/2006 | Barclay et al. |
| 7,096,009 B2 | 8/2006 | Mousseau et al. |
| 7,120,455 B1 | 10/2006 | Chen et al. |
| 7,139,797 B1 | 11/2006 | Yoakum et al. |
| 7,143,214 B2 | 11/2006 | Hayes et al. |
| 7,184,523 B2 | 2/2007 | Dixit et al. |
| 7,196,630 B2 | 3/2007 | Baker |
| 7,212,111 B2 | 5/2007 | Tupler et al. |
| 7,215,750 B2 | 5/2007 | Nguyen et al. |
| 7,231,428 B2 | 6/2007 | Teague |
| 7,248,677 B2 | 7/2007 | Randall et al. |
| 7,269,413 B2 | 9/2007 | Kraft |
| 7,330,721 B2 | 2/2008 | Bhatia et al. |
| 7,346,668 B2 | 3/2008 | Willis |
| 7,440,900 B2 | 10/2008 | Chang |
| 7,487,190 B2 | 2/2009 | Black et al. |
| 7,526,306 B2 | 4/2009 | Brems et al. |
| 7,529,540 B2 | 5/2009 | Cox et al. |
| 7,542,558 B2 | 6/2009 | Klein et al. |
| 7,548,756 B2 | 6/2009 | Velthuis et al. |
| 7,640,293 B2 | 12/2009 | Wilson et al. |
| 7,796,998 B1 | 9/2010 | Zellner et al. |
| 7,953,447 B2 | 5/2011 | Shostak |
| 8,036,356 B1 | 10/2011 | Ghosh et al. |
| 8,185,132 B1 | 5/2012 | Katpelly et al. |
| 2001/0028703 A1 | 10/2001 | Katseff et al. |
| 2002/0055088 A1 | 5/2002 | Feig |
| 2002/0098844 A1 | 7/2002 | Friedenfelds et al. |
| 2002/0172339 A1 | 11/2002 | Creswell et al. |
| 2003/0050984 A1 | 3/2003 | Pickup et al. |
| 2003/0112928 A1 | 6/2003 | Brown et al. |
| 2003/0119495 A1 | 6/2003 | Hanninen et al. |
| 2003/0147518 A1 | 8/2003 | Albal et al. |
| 2003/0152206 A1 | 8/2003 | Kawaguchi et al. |
| 2003/0182052 A1 | 9/2003 | DeLorme et al. |
| 2003/0229717 A1 | 12/2003 | Teague |
| 2004/0066920 A1 | 4/2004 | Vandermeijden |
| 2004/0157562 A1 | 8/2004 | Ovaskainen et al. |
| 2004/0186848 A1 | 9/2004 | Kobashikawa et al. |
| 2005/0033811 A1 | 2/2005 | Bhogal et al. |
| 2005/0202781 A1 | 9/2005 | Steelberg et al. |
| 2005/0272448 A1 | 12/2005 | Tran et al. |
| 2006/0034441 A1 | 2/2006 | Kraft |
| 2006/0052116 A1 | 3/2006 | Bhogal et al. |
| 2006/0064739 A1 | 3/2006 | Guthrie et al. |
| 2006/0128411 A1 | 6/2006 | Turcanu |
| 2006/0153349 A1 | 7/2006 | Brun et al. |
| 2006/0171523 A1 | 8/2006 | Greenwell |
| 2006/0199567 A1 | 9/2006 | Alston |
| 2006/0200490 A1 | 9/2006 | Abbiss |
| 2006/0215823 A1 | 9/2006 | Gruchala et al. |
| 2006/0247853 A1 | 11/2006 | Jung et al. |
| 2006/0253593 A1 * | 11/2006 | Jachner ............... 709/227 |
| 2007/0036316 A1 | 2/2007 | Croak et al. |
| 2007/0091878 A1 | 4/2007 | Croak et al. |
| 2007/0117552 A1 | 5/2007 | Gobburu et al. |
| 2007/0135110 A1 | 6/2007 | Athale et al. |
| 2007/0197233 A1 | 8/2007 | Feng |
| 2007/0243880 A1 | 10/2007 | Gits et al. |
| 2007/0249327 A1 | 10/2007 | Nurmi |
| 2007/0260725 A1 | 11/2007 | McCuller |
| 2007/0266097 A1 | 11/2007 | Harik et al. |
| 2007/0281689 A1 | 12/2007 | Altman et al. |
| 2008/0125106 A1 | 5/2008 | Lee et al. |
| 2008/0214148 A1 | 9/2008 | Ramer et al. |
| 2008/0250066 A1 | 10/2008 | Ekstrand et al. |
| 2008/0304637 A1 | 12/2008 | Ganganna |
| 2009/0034696 A1 | 2/2009 | Ramanathan |
| 2009/0063154 A1 | 3/2009 | Gusikhin et al. |
| 2009/0086947 A1 | 4/2009 | Vendrow |
| 2009/0104895 A1 | 4/2009 | Kasturi et al. |
| 2009/0124243 A1 | 5/2009 | Routley et al. |
| 2009/0186629 A1 | 7/2009 | Soelberg et al. |
| 2009/0197621 A1 | 8/2009 | Book |
| 2009/0215486 A1 | 8/2009 | Batni et al. |
| 2009/0216775 A1 | 8/2009 | Ratliff et al. |
| 2009/0219921 A1 | 9/2009 | Beinroth et al. |
| 2009/0225968 A1 | 9/2009 | Paranjape et al. |
| 2009/0275307 A1 | 11/2009 | Kahn |
| 2009/0311999 A1 | 12/2009 | Sarkar et al. |
| 2009/0316951 A1 | 12/2009 | Soderstrom |
| 2010/0130213 A1 | 5/2010 | Vendrow et al. |
| 2010/0149306 A1 | 6/2010 | Gopal et al. |
| 2010/0228560 A1 | 9/2010 | Balasaygun et al. |
| 2010/0316205 A1 | 12/2010 | Zheng et al. |
| 2010/0317341 A1 | 12/2010 | Ferren |
| 2011/0034156 A1 | 2/2011 | Gatti et al. |
| 2011/0212712 A1 | 9/2011 | Abdel-Kader |
| 2012/0135716 A1 | 5/2012 | Katpelly et al. |
| 2012/0135718 A1 | 5/2012 | Amidon et al. |
| 2012/0135744 A1 | 5/2012 | Curtis et al. |
| 2012/0136529 A1 | 5/2012 | Curtis et al. |
| 2012/0136942 A1 | 5/2012 | Amidon et al. |

FOREIGN PATENT DOCUMENTS

| | | |
|---|---|---|
| JP | 2004205443 A | 7/2004 |
| JP | 2007079945 A | 3/2007 |
| TW | 262408 B | 9/2006 |
| WO | 01/31964 A1 | 5/2001 |
| WO | 01/58165 A2 | 8/2001 |
| WO | 02/11407 A2 | 2/2002 |
| WO | 2006/075853 A1 | 7/2006 |
| WO | 2009/022446 A1 | 2/2009 |

OTHER PUBLICATIONS

Campbell, A. T. and Choudhury, T., "Toward Societal Scale Sensing using Mobile Phones," white paper presented at the NSF Workshop on Future Directions in Networked Sensing Systems, Nov. 12-13, 2009, Arlington, Virginia, 1 page.

Campbell, A. T. et al., "CenceMe: Injecting Sensing Presence into Social Network Applications using Mobile Phones (Demo Abstract)," In Proc. of Ninth ACM International Symposium on Mobile Ad Hoc Networking and Computing (MobiHoc '08), Hong Kong, May 27-30, 2008, 2 pages.

Campbell, A. T. et al., "CenceMe: Injecting Sensing Presence into Social Network Applications using Mobile Phones (Demo Abstract)," In Proc. of Ninth Workshop on Mobile Computing Systems and Applications (HotMobile 2008), Napa Valley, California, Feb. 25-26, 2008, 1 page.

Campbell, Andrew T. et al., "Demo Abstract: Transforming the Social Networking Experience with Sensing Presence from Mobile Phones," SenSys'08, Nov. 5-7, 2008, Raleigh, North Carolina, 2 pages.

Campbell, Andrew T. et al., "People-Centric Urban Sensing," In Proc. of Second ACM/IEEE Annual International Wireless Internet Conference (WICON 2006), Boston, Massachusetts, Aug. 2-5, 2006, 14 pages.

Campbell, Andrew T. et al., "The Rise of People-Centric Sensing," IEEE internet Computing, Jul./Aug. 2008, published by the IEEE Computer Society, copyright 2008, IEEE, pp. 12-21, 10 pages.

"City to showcase Typetalk phone system for deaf," NEWS.scotsman.com, at <http://news.scotsman.com/health/City-to-showcase--Typetalk.4755272.jp>, updated on Dec. 3, 2008, printed May 2, 2011, 2 pages.

Eisenman, S. and Campbell, A., "E-CSMA: Supporting Enhanced CSMA Performance in Experimental Sensor Networks using Per-neighbor Transmission Probability Thresholds," In Proc. of IEEE INFOCOM 2007, Anchorage, Alaska, May 6-12, 2007, 9 pages.

(56) References Cited

OTHER PUBLICATIONS

Eisenman, S. B. and Campbell, A. T., "Structuring Contention-based Channel Access in Wireless Sensor Networks," IPSN'06, Apr. 19-21, 2006, Nashville, Tennessee, copyright 2006, ACM, 9 pages.

Eisenman, S. B. et al., "The BikeNet Mobile Sensing System for Cyclist Experience Mapping," SenSys '07, Nov. 6-9, 2007, Sydney, Australia, copyright 2007, ACM, 15 pages.

Eisenman, Shane B. et al., "BikeNet: A Mobile Sensing System for Cyclist Experience Mapping," ACM Transactions on Sensor Networks, vol. 6, No. 1, Article 6, Dec. 2009, copyright 2009, ACM, 39 pages.

Eisenman, Shane B. et al., "MetroSense Project: People-Centric Sensing at Scale," WSW'06 at SenSys '06, Oct. 31, 2006, Boulder, Colorado, copyright 2006, ACM, 6 pages.

Eisenman, Shane B. et al., "Techniques for Improving Opportunistic Sensor Networking Performance," In Proc. of International Conference on Distributed Computing in Sensor Networks (DCOSS 2008), Santorini Island, Greece, Jun. 11-14, 2008, 20 pages.

"Ensure calls are never missed with SwyxWare Extended Call Routing," SAS.UK, originally found at <http://www.sas-uk.net/Swyx-Extended-Call-Routing.htm>, found at Internet Archive, dated May 9, 2008, printed May 2, 2011, 1 page.

Fallon, Sean, "Tame Cube Concept: A Good Excuse is Just a Roll Away," Apr. 10, 2008, at <http://gizmodo.com/378514/tame-cube-concept-a-good-excuse-is-just-a-roll-away>, printed Oct. 13, 2011, 2 pages.

Forrest, Brady, "iPhone's Location-Aware Apps," O'Reilly Radar, Jul. 14, 2008, copyright 2005-2009, O'Reilly Media, Inc., Internet publication, at <http://radar.oreilly.com/2008/07/iphone-location-aware-apps.html>, printed Sep. 15, 2009, 3 pages.

"Free Long Distance Calls via Google Maps," article published on Feb. 21, 2007, at <http://www.fivecentnickel.com/2007/02/21/free-long-distance-calls-via-google-maps>, copyright 2005-2008, PlanetB Media, LLC, printed Nov. 11, 2008, 7 pages.

"G-Park," PosiMotion website, at <http://www.posimotion.com/index.php?go=applications&option=view&entry=1>, copyright 2007-2009, PosiMotion LLC, 2 pages.

"GeoWhitePages," dated Aug. 6, 2006, at <http://babasave.wordpress.com/2006/08/06/geowhitepages>, printed Nov. 11, 2008, 3 pages.

"Gizmo5," Wikipedia, found at <http://en.wikipedia.org/wiki/Gizmo5> on Internet Archive, last modified May 31, 2008, capture Jun. 13, 2008, printed Nov. 11, 2011, 2 pages.

"Google Maps Mania: Google Maps US/Canada Phone Book Mashups," dated Jun. 9, 2006, posted by Mike Pegg, at <http://googlemapsmania.blogspot.com/2006/06/google-maps-uscanada-phone-book.html>, printed Nov. 11, 2008, 1 page.

"Google PhoneBook," at <http://snopes.com/computer/internet/google.asp>, last updated Feb. 21, 2005, copyright 1995-2008, snopes.com, printed Nov. 11, 2008, 2 pages.

"Google Stalk," at <http://shinyplasticbag.com/projects/stalk>, available on the Internet Archive as of Jan. 4, 2006, printed Nov. 11, 2008, 1 page.

"GrandCentral," Wikipedia, found at <http://en.wikipedia.org/wiki/GrandCentral> on Internet Archive, last modified Aug. 8, 2008, captured Aug. 10, 2008, printed Nov. 11, 2011, 2 pages.

"IBM WebSphere Presence Server," IBM Data Sheet, Dec. 2007, IBM Corporation, found at ftp://public.dhe.ibm.com/software/pervasive/presenceserver/Presence_6_2_DS_Final.pdf, 4 pages.

"Ifbyphone: IVR Solutions, Click to Call, Voice Broadcast, Call Routing," originally found at <http://public.ifbyphone.com/>, archived dated Jul. 2, 2008, found using the Internet Archive, copyright 2008, ifbyphone, printed Apr. 27, 2011, 4 pages.

Kaowthumrong, K. et al., "Automated Selection of the Active Device in Interactive Multi-Device Smart Spaces," in Workshop at UbiComp'02: Supporting Spontaneous Interaction in Ubiquitous Computing Settings, Goteborg, Sweden, Sep. 29-Oct. 1, 2002, 6 pages.

Koumpis, K. and Renals, S., "The Role of Prosody in a Voicemail Summarization System," In Proc. International Speech Communication Association (ISCA) Workshop on Prosody in Speech Recognition and Understanding, Red Bank, NJ, Oct. 22-24, 2001, pp. 87-92, 6 pages.

Lane, Nicholas D. et al., "A Survey of Mobile Phone Sensing," IEEE Communications Magazine, Sep. 2010, copyright 2010, IEEE, pp. 140-150, 11 pages.

Lane, Nicholas D. et al., "Ambient Beacon Localization: Using Sensed Characteristics of the Physical World to Localize Mobile Sensors," EmNets'07, Jun. 25-26, 2007, Cork, Ireland, copyright 2007, ACM, 5 pages.

Lane, Nicholas D. et al., "Cooperative Techniques Supporting Sensor-based People-centric Inferencing," In Proc. of Sixth International Conference on Pervasive Computing, Sydney, Australia, May 19-22, 2008, 18 pages.

Lane, Nicholas D. et al., "The Influence of Microprocessor Instructions on the Energy Consumption of Wireless Sensor Networks," In Proc. of Third Workshop on Embedded Networked Sensors (EmNets 2006), pp. 41-45, May 30-31, 2006, Cambridge, Massachusetts, 5 pages.

Lane, Nicholas D. et al., "Urban Sensing: Opportunistic or Participatory?," In Proc. of Ninth Workshop on Mobile Computing Systems and Applications (HotMobile 2008), Feb. 25-26, 2008, Napa Valley, California, 6 pages.

Lane, Nicholas D. et al., "Urban Sensing: Opportunistic or Participatory?," In Proc. of First Workshop Sensing on Everyday Mobile Phones in Support of Participatory Research, Nov. 6, 2007, Sydney, Australia, 1 page.

Lee, S.-B. et al., "Solicitation-based Forwarding for Sensor Networks," In Proc. of Third Annual IEEE Conf. on Sensor, Mesh and Ad Hoc Communications and Networks (SECON 2006), Reston, Virginia, Sep. 25-28, 2006, 10 pages.

Lu, H. et al., "SoundSense: Scalable Sound Sensing for People-Centric Applications on Mobile Phones," MobiSys'09, Jun. 22-25, 2009, Krakow, Poland, copyright 2009, ACM, 14 pages.

Lu, Hong et al., "Bubble-Sensing: A New Paradigm for Binding a Sensing Task to the Physical World using Mobile Phones," In Intl. Workshop on Mobile Devices and Urban Sensing, St. Louis, Missouri, Apr. 21, 2008, 7 pages.

Messner, Richard A., "An Integrated Command Control and Communications Center for First Responders," Department of Electrical and Computer Engineering, University of New Hampshire, Durham, New Hampshire, 2005, found at <http://www.ece.unh.edu/svpal/Papers/2005%20SPIE%20Paper.pdf>, 14 pages.

Milewski, Allen E. and Smith, Thomas M., "Providing Presence Cues to Telephone Users," AT&T Labs, Research, Oct. 3, 2000, at <http://web.mitedu/bentley/www/mobile/papers/presencecues.pdf>, 9 pages.

Miluzzo, E. et al., "CaliBree: A Self-calibration System for Mobile Sensor Networks," S. Nikoletseas et al. (Eds.), DCOSS 2008, LNCS 5067, copyright 2008, Springer-Verlag Berlin Heidelberg, pp. 314-331, 18 pages.

Miluzzo, E. et al., "CenceMe—Injecting Sensing Presence into Social Networking Applications," G. Kortuem et al., (Eds.), EuroSSC, 2007, LNCS 4793, pp. 1-28, copyright 2007, Springer-Verlag Berlin Heidelberg, 28 pages.

Miluzzo, E. et al., "Evaluating the iPhone as a Mobile Platform for People-Centric Sensing Applications," UrbanSense08, Nov. 4, 2008, Raleigh, North Carolina, pp. 41-45.

Miluzzo, E. et al., "Poster Abstract: Virtual Sensing Range," SenSys'06, Nov. 1-3, 2006, Boulder, Colorado, copyright 2006, ACM, 2 pages.

Miluzzo, E. et al., "Radio Characterization of 802.15.4 and Its Impact on the Design of Mobile Sensor Networks," R. Verdone (Ed.), EWSN 2008, LNCS 4913, pp. 171-188, copyright 2008, Springer-Verlag Berlin Heidelberg, 18 pages.

Miluzzo, E. et al., "Sensing Meets Mobile Social Networks: The Design, Implementation and Evaluation of the CenceMe Application," SenSys'08, Nov. 5-7, 2008, Raleigh, North Carolina, pp. 337-350, copyright 2008, ACM, 14 pages.

Musolesi, M. et al., "The Second Life of a Sensor: Integrating Real-world Experience in Virtual Worlds using Mobile Phones," HotEmNets'08, Jun. 2-3, 2008, Charlottesville, Virginia, copyright 2008, ACM, 5 pages.

(56) References Cited

OTHER PUBLICATIONS

"Park-n Find 2.0—iPhone App Index," at <http://www.iphoneappindex.com/2009/11/19/parkn-find-2-0>, Nov. 19, 2009, copyright 2009, iPhone App Index, 8 pages.

"Polar Bear Farm—iPhone Apps," at <http://www2.polarbearfarm.com/telegram.html>, copyright 2008, Polar Bear Farm Ltd, printed Apr. 27, 2011, 2 pages.

Scotsman.com, "City to showcase Typetalk phone system for deaf," Dec. 3, 2008, at <http://www.scotsman.com/news/city_to_showcase_typetalk_phone_system_for_deaf_1_1280979>, printed Oct. 13, 2011, 1 page.

"slydial situations," originally found at <http://slydial.coml>, earliest archived dated Aug. 27, 2008, found using the Internet Archive, printed Apr. 27, 2011, 2 pages.

"Ultimate Android," Dec. 2009, 5 pages.

"User-Centric Implications | RebelVox Technology," User Benefits, found at <http://www.rebelvox.com/en/technology/user-benefits.php> on the Internet Archive, dated Mar. 1, 2009, copyright 2009, RebelVox, printed Nov. 11, 2011, 1 page.

Wan, C.-Y. et al., "Overload Traffic Management for Sensor Networks," ACM Transactions on Sensor Networks, vol. 3, No. 4, Article 18, Oct. 2007, copyright 2007, ACM, 38 pages.

Method and System to Precisely Identify and Notify Callee's Status in Cellular Phone, URL: http://priorartdatabase.com/IPCOM/000175628, Oct. 16, 2008.

iCAMS: A Mobile Communication Tool Using Location and Schedule Information, PERVASIVE computing, IEEE CS and IEEE Com Soc, 1536-1268/04, IEEE.

Cellity Address Book 2.0, Mobile Media Summit, Medienforum nrw, Koln, Jun. 24, 2009.

\* cited by examiner

SYSTEMS AND METHODS FOR ENABLING RECIPIENT CONTROL OF COMMUNICATIONS

CROSS REFERENCE TO RELATED APPLICATION

This application claims the benefit of U.S. provisional patent application No. 61/309,899, filed Mar. 3, 2010, and titled DYNAMIC UPDATES TO ADDRESS BOOK CONTACTS: THE HANDHELD AS PERSONAL BLACK BOX, the content of which is hereby incorporated herein by reference in its entirety.

TECHNICAL FIELD

The present disclosure relates to systems and methods for communication management.

BACKGROUND

A wide variety of devices are enabled with functionality for allowing a user to initiate a communication with another. For example, computers and mobile devices may be used for communicating with another via a voice call, an email, an instant message, a text message, or a social networking service (e.g., FACEBOOK® social networking service). Often, an initiator of a communication does not have information regarding the availability of an intended recipient for accepting the communication. Particularly, the initiator may not know whether the intended recipient's device is available for a communication, or whether the intended recipient is busy at work or otherwise preoccupied. In such instances, a communication, such as a call, may be directed to voicemail, and the caller may still be left without knowing when the callee would be available for a call. For at least these reasons, it is desirable to provide improved systems and methods for coordinating electronic communications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are methods and systems for enabling recipient control of communications. According to an aspect, a method may include receiving a communication request identifying a proposed timing of a communication and/or a proposed communication channel for the communication. The method may also include receiving selection of an actual timing and/or an actual communication channel for the communication. Further, the method may include initiating the communication based on the selection.

According to an aspect, a method may include receiving a plurality of communication requests for communications. The method may also include categorizing the communication requests. Further, the method may include queuing the communication requests for initiating the communications based on the categorizations.

In an example, one or more communication requests may identify an importance level for the communications. Categorization of the communication requests may include categorizing the communication requests based on the identified importance level.

In another example, one or more communication requests may identify a timing of a communication and/or a communication channel for the communication. Categorization of the communication requests may include categorizing the communication requests based on a timing of the communication and/or the communication channel for the communication.

In another example, categorization of communication requests may include categorizing the communication requests based on identities of the requesters of the communications, a current location of a recipient of the communication requests, a context of the communication requests, a timing, and/or urgency.

In another example, each communication request may identify a proposed timing of a communication and/or a proposed communication channel for the communication. Categorization of the communication requests may include categorizing the communication requests based on the proposed timing of the communication and/or the proposed communication channel for the communication.

In another example, one or more communication request may identify a proposed time period for a respective communication. Categorization of the communication requests may include categorizing the communication requests based on the at least one proposed time period.

In an example, queuing of communication requests may include placing the communication requests in a queue. An example method may include initiating communications in accordance with the queue.

According to an aspect, a method may include controlling a user interface to notify a recipient of the communication requests. For example, a display of a computing device may display notification of one or more communication requests.

According to an aspect, a method may include receiving a communication request for a communication. The communication request may identify an intended recipient and a conditional parameter for initiating the communication. The method may include determining whether the conditional parameter is met. The method may also include initiating the communication in response to determining that the conditional parameter is met.

In an example, a method may include communicating another communication request identifying another recipient in response to determining that the conditional parameter is not met.

In another example, a communication request may identify a timing of the communication and/or a communication channel for the communication.

In another example, a method may include receiving user input specifying the communication request.

In another example, a communication request may be communicated to a server via a suitable network. The server may determine whether a conditional parameter is met and may initiate the communication.

In an example, a communication request may identify an aggressiveness level for the communication. Initiation of the communication may include attempting to initiate the communication based on the aggressiveness level.

In an example, a conditional parameter includes a status of a device associated with the intended recipient.

In an example, a method may include determining the status of the device based on user inputs of the device, an application running on the device, and/or a location of the device.

According to an aspect, a method may include receiving a communication request identifying multiple communication recipients. The method may also include receiving selection of a timing and/or a communication channel for at least one communication. The method may also include initiating at least one communication with at least one of the communication recipients.

In an example, a method may include canceling planned communication requests associated with the other communication recipients in response to initiating a communication with one or more of the communication recipients.

In an example, a method may include receiving a conditional communication parameter. The method may also include initiating a communication with one or more communication recipients based on the conditional communication parameter.

In another example, a conditional communication parameter includes a status of one or more devices associated with the intended communication recipients.

In another example, a method includes determining a status based on user inputs of the at least one device, an application running on the at least one device, and/or a location of the at least one device.

In another example, a method may include canceling communication requests associated with the other communication recipients in response to initiating one or more communications with one or more communication recipients.

In another example, a method may include identifying one or more communication recipients for receipt of the communication request.

In another example, a method may include determining whether communication occurs with the identified communication recipient. Further, the method may include initiating a communication with one of the other communication recipients in response to determining that the communication does not occur between the identified communication recipient.

In another example, a method may include receiving selection of a particular communication request. The method may also include initiating the communication associated with the particular communication request in response to receiving the selection.

According to an aspect, a method may include receiving a communication request identifying a recipient and a proposed timing of a communication and/or a proposed communication channel for the communication. The method may also include storing the communication request for access by the recipient.

In an example, a method may include receiving selection of an actual timing and/or an actual communication channel for the communication. The method may also include initiating the communication based on the selection.

In another example, a method may include storing multiple communication requests for multiple recipients.

In another example, a method may include communicating the communication request to multiple devices associated with a recipient.

In another example, a method may include receiving a request for a communication request from a device associated with the recipient. The method may also include communicating the communication request to the recipient in response to receiving the request.

In another example, a method may include receiving an indication of a call, text message, instant message, social network communication, the like, and combinations thereof. In another example, a method may include receiving selection of a particular communication request. The method may also include initiating the communication associated with the particular communication request in response to receiving the selection.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
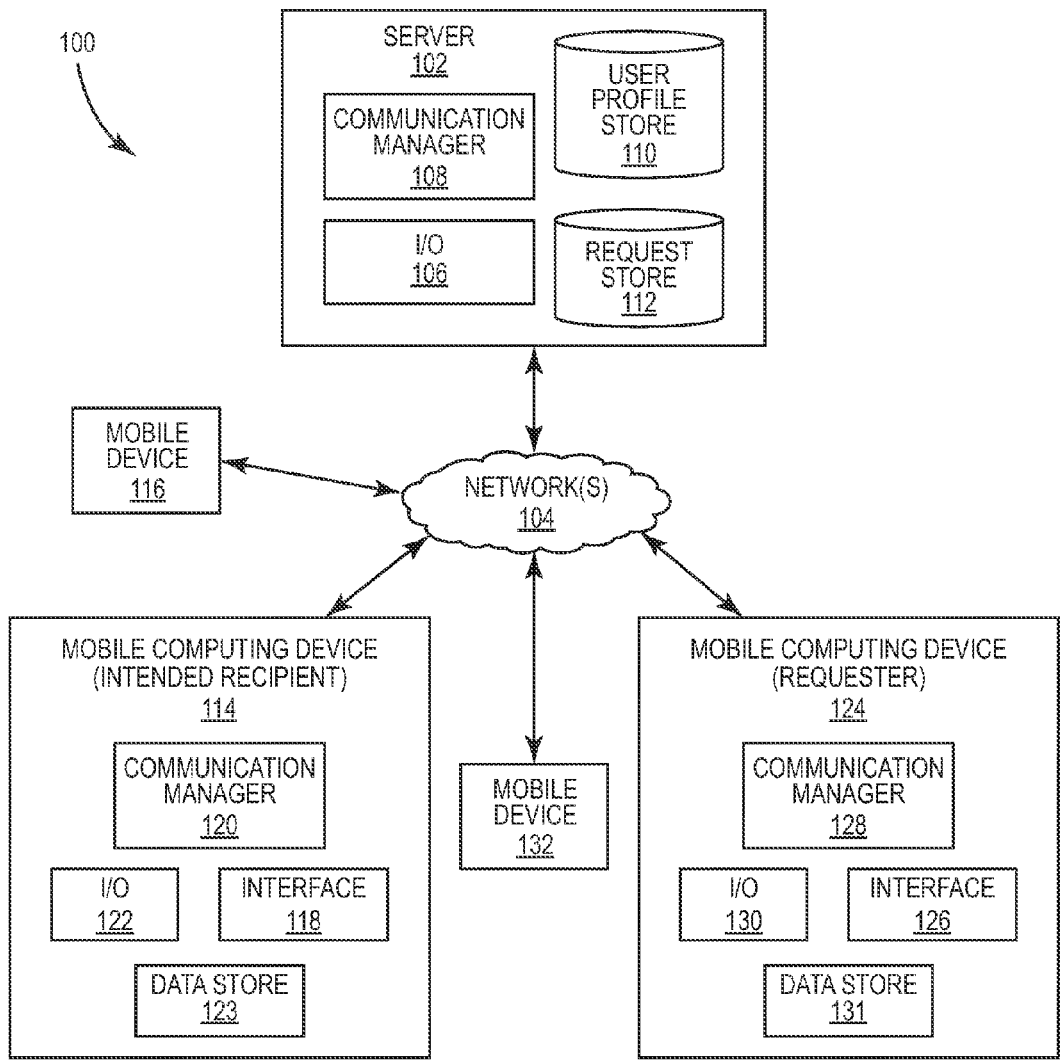
FIG. 1 is a schematic diagram of a system for enabling recipient control of communications according to embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present disclosure enable a computing device to receive a communication request identifying a proposed timing of a communication and/or a proposed communication channel for the communication, to receive selection of an actual timing and/or an actual communication channel for the communication, and to initiate the communication based on the selection. Other embodiments of the present disclosure enable a computing device to receive multiple communication requests, to categorize the communication requests, and to queue the communication requests for initiating the communication based on the categorizations.

Still other embodiments of the present disclosure enable a computing device to receive a communication request for a communication. The communication request identifies an intended recipient and a conditional parameter for initiating the communication. The computing device is also enabled to determine whether the conditional parameter is met, and to initiate the communication in response to determining that the conditional parameter is met. Other embodiments of the present disclosure enable a computing device to receive a communication request identifying multiple communication recipients, to receive selection of the timing and the communication channel for one or more communications, and to initiate one or more communications with one or more of the recipients. Still other embodiments of the present disclosure enable a computing device to receive a communication request identifying a recipient and one or more of a proposed timing of a communication and a proposed communication channel for the communication, and to store the communication request for access by the recipient.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, or the like. A computing device can also include any type of conventional computer, for example, a desktop computer, a laptop computer, a netbook computer, a notebook computer, a server, or the like. A typical mobile device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers (which are web browsers with small file sizes that can accommodate the reduced memory constraints of wireless networks), on other client applications accessed via the graphical displays, on client applications that do not utilize a graphical display, or the like. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, an "interface" is generally a system by which users interact with a computing device. An interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by, and interacted with by, a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

As referred to herein, a "communication channel" is any suitable type of connection between computing devices in which data may be exchanged. For example, a communication channel may be established between computing devices via a telephone call, an email communication, a text message communication, an instant message communication, and the like.

Operating environments in which embodiments of the present disclosure may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device, a 3G-compliant device, or a 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

The presently disclosed subject matter is now described in more detail. For example, FIG. 1 is a schematic diagram of a system 100 for enabling recipient control of communications according to embodiments of the present disclosure. Referring to FIG. 1, the system 100 includes a server 102, which may be any type of computing device capable of communicating via one or more networks 104 (e.g., the Internet, wired networks, wireless networks, and the like). Particularly, the server 102 includes an input/output (I/O) module 106 or any other suitable communication interface configured to communicate with the network 104 and any devices communicatively connected thereto. The server 102 includes a number of functional components. This representation of the server 102 is meant to be for convenience of illustration and description, and it should not be taken to limit the scope of the present disclosure as one or more functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The server 102 is Internet-accessible and can interact with other computing devices via known Internet protocols such as HTTP, HTTPS, and the like. The server 102 is shown as a single device but this is not a requirement; one or more programs, processes, or other code may comprise the server and be executed on one or more machines (in one or more networked locations).

The server 102 includes a communication manager 108 configured to store user profiles in a user profile store 110. For example, users may utilize a computing device to access the server 102 for storing their profile information, including information relating to communicating with them. In an example, user profile information may be received from one or more computing devices of a user. This profile information may be used by the server 102 for controlling communications to the users and for notifying the users of communication requests. In this way, users are provided with a measure of control over communications to them. A user profile may include, for example, but not limited to, an identifier for a user, one or more identifiers for communicating with the user, presence information, communication channel information, and the like. An identifier for a user may include, but is not limited to, a name of the user. Identifiers for communicating with a user may include, but is not limited to, one or more phone numbers and/or one or more email addresses for communicating with the user. Presence information includes one or more status indicators that convey ability and willingness of a user to communicate. For example, presence information may indicate when a user is available for communication and/or when a user is unavailable for communication. The communication channel information may indicate communication channel preferences for a user, such as, one or more preferred communication channels for the user. For example, a communication channel preference may indicate that email communication is preferred over voice communication, or communication via one telephone number is preferred over another telephone number. As will be described in further detail herein, user profile information may be used for controlling communication requests and communications to the user.

User profile information may include status information about a device of a user. In an example, the status of the device may be used for determining an availability of a user of the device to communicate with a communication requester, or originator of the request. The status of the device may be generated based on user inputs into a device associated with a user, user inputs into a device receiving a communication request, an application running on a device associated with a user, an application running on a device receiving a communication request, a location of a device associated with a user, a location of a device receiving a communication request, the like, or combinations thereof. In the example of user input, a user may specify that he or she is unavailable or available for a communication, is busy working, is traveling, and/or the like. In this example, the user profile of the user may be set to the specified status for controlling communication requests to the user. In the example of an application, an application running on a device associated with a user may automatically set a status of the user. In this example, work-related applications may specify that the user is working, and a status of the user stored at the server 102 may be set to the status specified by the application. In the example of device location, the status of a user may be set to a current or previous location of a device of the user, and the location may be stored at the server 102. For example, if the location corresponds to a work location associated with the user, the status of the user at the server 102 may be set to "working" or "at work." Further, the user may specify input for specifying his or her availability. Other activities of the user may be determined based on input to a mobile computing device of the user, and initiation of a communication (e.g., timing and/or communication channel) may be based on the determined activity. Further, a state of a device of a request recipient may be determined based on applications being run by the device, and initiation of a communication may be based on the state. As will be described in further detail herein, user status information may be used for controlling communication requests and communications to the user.

The communication manager 108 may store communication requests in a request store 112. A communication request may be received from users desiring to communicate with other users. For example, a communication request may be received from a computing device of a requester or originator of the request. In this example, the requester may use the mobile computing device to interface with the server 102 for submitting a communication request for an intended recipient. Communication requests may each identify one or more intended recipients of a communication request (e.g., a user associated with a user profile stored on the server 102), a proposed timing of a communication, and/or a proposed communication channel for the communication. For example, the communication request may indicate a proposed time period (e.g., date and time) for a communication. The communication request may also indicate that, for example, email is the proposed communication channel. One or more communication channels may be proposed for communication with the intended recipient. For example, the proposed communication channels may include, but are not limited to, a call, text message, instant message, social network communications, the like, and combinations thereof. As will be described in further detail herein, communication request parameters, such as a proposed timing of a communication and a proposed communication channel for a communication, may be used for controlling communication requests and communications to an intended recipient of a communication.

The operation of the system can be described by the following example. As shown in FIG. 1, the server 102 includes various functional components and data stores 110 and 112 to facilitate the operation. The operation of the disclosed methods may be implemented using system components other than as shown in FIG. 1. The server 102 may use the I/O module 106 for interacting with the network(s) 104 and various computing devices communicatively connected to the network(s) 104.

In this example system, the communication manager 108 of the server 102 may be one or more modules implemented with software and/or hardware configured to receive communication requests and to initiate communications, as well as other functions described herein. For ease of illustration, the communication manager 108 is only graphically shown in FIG. 1 as a single component of the server 102; although, the communication manager 108 may be implemented with one or more combinations of hardware, software, and firmware. Other components shown in FIG. 1 will be described in further detail herein below.

Figure 2:
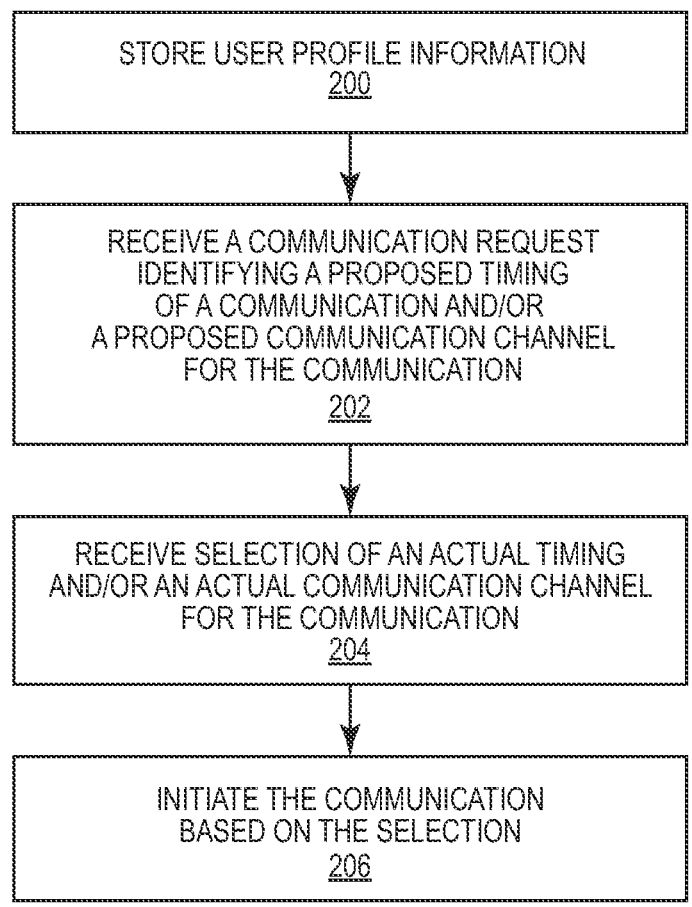
FIG. 2 is a flow chart of an exemplary method for controlling communications according to embodiments of the present disclosure.

FIG. 2 illustrates a flow chart of an exemplary method for controlling communications according to embodiments of the present disclosure. In this example, reference is made to the server 102 shown in FIG. 1 for purposes of illustration; however, reference to the server 102 should not be construed as limiting, and it should be appreciated that the method may be implemented by any suitable computing device.

Referring to FIG. 2, the method includes storing user profile information (step 200). For example, the communication manager 108 may store user profile information for a user in the user profile store 110. In this example, the stored user profile information may be profile information for a user associated with devices 114 and 116. In this example, the devices 114 and 116 may both be operated by the same user. Some or all of the user profile information may be received from the mobile computing device 114 and/or mobile device 116, or generated based on information from the mobile computing device 114 or other devices associated with the user. For example, presence information may be automatically generated by the mobile computing device 114 or another computing device aware of the presence status of the mobile computing device 114. The presence information may, for example, indicate that the mobile computing device 114 is activated (i.e., turned on) and is capable of receiving communications (e.g., the mobile computing device is located in a mobile telephone service area).

In another example of specifying presence information, the user of the mobile computing device 114 may enter input by use of an interface 118 of the mobile computing device 114 for specifying presence information of the user. For example, the user may enter input specifying one or more status indicators that convey the ability and willingness of the user to communicate, such as, but not limited to, an indication when a user is available for communication and/or when a user is unavailable for communication. In response to entry of the specified presence information, a communication manager 120 of the mobile computing device 114 may communicate the presence information to the server 102 for storage and use by the communication manager 108 as user profile information according to embodiments of the present disclosure. The user of the mobile computing device 114 may enter input by use of the interface 118 for specifying any other profile information as disclosed herein.

User profile information may be communicated from the mobile computing device 114 to the server 102 via any suitable communication technique. For example, the network(s) 104 may include a cellular network communicatively connected to the server 102 and the mobile computing device 114. The communication manager 120 of the mobile computing device 114 may be configured to control an I/O module 122 or any other suitable communication interface to communicate the user profile information to the network(s) 104 for transmission to the server 102. Further, for example, the I/O module 122 may wirelessly communicate with a base station for communicating with other mobile computing devices and for communicating with the Internet. The mobile computing device 114 may include suitable hardware, software, and/or firmware for establishing a telephone call between the mobile computing device 114 and another mobile computing device. Such a telephone call can be implemented via suitable network components, such as, but not limited to, a base station, an MSC, and various other network components, which are not shown herein for ease of illustration. The mobile computing device 114 may include a data store 123 for storing data and instructions.

In another example, entry of user profile information and other interactions by the user with the mobile computing device 114 in accordance with embodiments of the present disclosure may be by use of an application (often referred to as an "app") residing on the mobile computing device 114 to interact with the communication manager 120. The application may reside on the mobile computing device 114 and may be a part of the communication manager 120. The user may, for example, input one or more commands into the interface 118 for selecting an icon to initialize the application. The application may have been downloaded from a web server, such as a web server (not shown), and installed on the mobile computing device 114 in any suitable manner. The application may be downloaded to another machine (such as the mobile phone user's PC) and then transferred to the mobile device over a medium such as a BLUETOOTH® connection. In an example, the application can enable the mobile computing device 114 with one or more of the features according to embodiments of the present disclosure.

Referring to FIG. 2, the method includes receiving a communication request identifying a proposed timing of a communication and/or a proposed communication channel for the communication (step 202). For example, the communication manager 108 may receive communication requests from computing devices via the network(s) 104. In an example, a user of a mobile computing device 124 may enter input for requesting communication with a user of the mobile computing device 114. The user of the mobile computing device 124 may enter input into an interface 126 for specifying a communication request for the user of the mobile computing device 114. In response to entry of the specified communication request, a communication manager 128 may communicate the communication request to the server 102 for storage and use by the communication manager 108 in accordance with embodiments of the present disclosure. The communication manager 108 may be configured to receive and store communication requests in the request store 112.

Communication request information may be communicated from the mobile computing device 124 via any suitable communication technique. For example, the communication manager 128 of the mobile computing device 124 may be configured to control an I/O module 130 or any other suitable communication interface to communicate a communication request to the network(s) 104 for transmission to the server 102. Further, for example, the I/O module 130 may wirelessly communicate with a base station for communicating with other mobile computing devices and for communicating with the Internet. The mobile computing device 124 may include suitable hardware, software, and/or firmware for establishing a telephone call between the mobile computing device 124 and another mobile computing device. Such a telephone call can be implemented via suitable network components, such as, but not limited to, a base station, an MSC, and various other network components, which are not shown herein for ease of illustration. The mobile computing device 124 may include a data store 131.

In another example, entry of communication requests and other interactions by the user with the mobile computing device 124 in accordance with embodiments of the present disclosure may be by use of an application residing on the mobile computing device 124 to interact with the communication manager 128. The application may reside on the mobile computing device 124 and may be a part of the communication manager 128. The user may, for example, input one or more commands into the interface 126 for selecting an icon to initialize the application. The application may have been downloaded from a web server, and installed on the mobile computing device 124 in any suitable manner. The application may be downloaded to another machine (such as the mobile phone user's PC) and then transferred to the mobile device over a medium such as a BLUETOOTH® connection. In an example, the application can enable the mobile computing device 124 with one or more of the features according to embodiments of the present disclosure.

Referring to FIG. 2, the method includes receiving selection of an actual timing and/or an actual communication channel for the communication (step 204). For example, selection of an actual timing and/or an actual communication channel for a communication may be selected at the server 102 or at the mobile computing device 114. In an example of selection at the server 102, the communication manager 108 may select an actual timing and communication channel for a communication based on user profile information. Particularly, for example, user profile information may specify a time when the user of the mobile computing device 114 is available for calls. Based on the specified time, the communication manager 108 may select the specified time as the actual timing of a communication, and may select calling as the communication channel.

In an example of selection at a mobile computing device, the mobile computing device 114 may access a communication request stored at the server 102 and select an actual timing and/or actual communication channel for the communication. Particularly, for example, the communication manager 120 may control communication of a request for communication requests from the server 102. In response to the request, the server 102 may send the communication request to the mobile computing device 114. The actual timing and/or actual communication channel may be automatically selected by the communication manager 120 based on user profile information stored at the mobile computing device 114 or at the server 102. In another example, the communication request may be presented to a user via the interface 118. In this example, the user may then enter input via the interface 118 for selecting an actual timing and/or actual communication channel for the communication.

Referring to FIG. 2, the method includes initiating the communication based on the selection (step 206). Continuing the aforementioned examples, a call between the mobile computing devices 114 and 124 may be initiated by the server 102. Particularly, for example, the communication manager 108 may call each of the mobile computing devices 114 and 124 and connect the call between the devices.

Further, continuing the aforementioned examples, the mobile computing device 114 may receive from the server 102 a telephone number for a requester (or originator of the request) associated with a communication request. In response to selecting an actual timing for a communication, the communication manager 120 may control initiation of a call to the mobile computing device 124 by dialing the received telephone number. In another example, upon receiving notification of the communication request, the user of the mobile computing device 114 may use the interface 118 for dialing the received telephone number to initiate the call to the mobile computing device 124.

Figure 3:
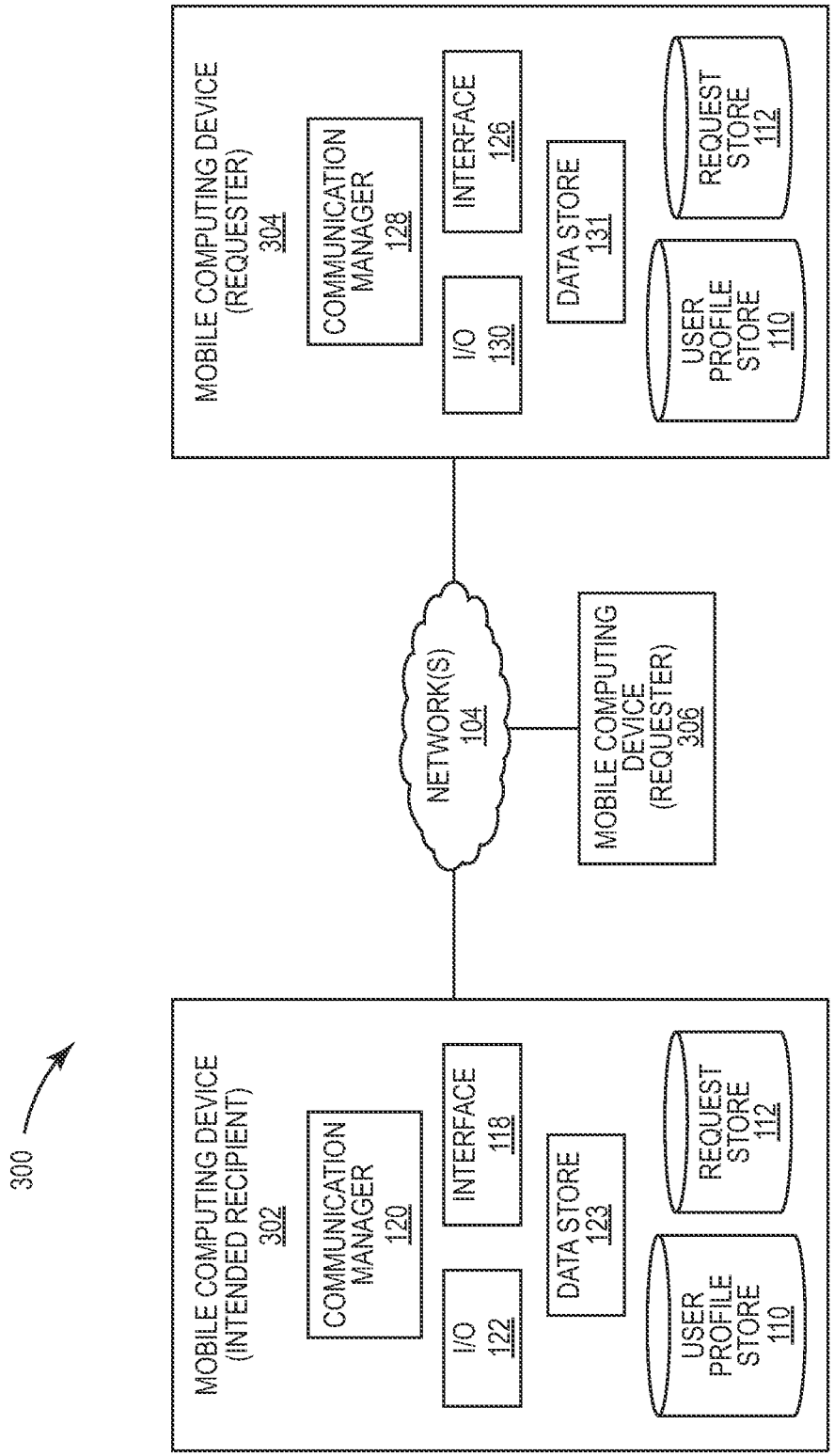
FIG. 3 is a schematic diagram of a system for enabling recipient control of communications at a mobile computing device according to embodiments of the present disclosure.

In accordance with embodiments of the present disclosure, recipient control of communications may be implemented entirely at a mobile computing device. For example, FIG. 3 is a schematic diagram of a system 300 for enabling recipient control of communications at a mobile computing device according to embodiments of the present disclosure. Referring to FIG. 3, the system 300 includes mobile computing devices 302 and 304, which may be capable of communicating with each other via the network(s) 104. The mobile computing devices 302 and 304 each include I/O module 122 and 130 configured to communicate with the network 104 and any devices communicatively connected thereto. The mobile computing devices 302 and 304 each include a number of functional components. These representations of the mobile computing devices 302 and 304 are meant to be for convenience of illustration and description, and they should not be taken to limit the scope of the present disclosure as one or more functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The mobile computing devices 302 and 304 are each Internet-accessible and can interact with other computing devices via known Internet protocols such as HTTP, HTTPS, and the like.

The communication managers 120 and 128 of the mobile computing devices 302 and 304, respectively, are configured to store a user profile of the respective user of the mobile computing devices 302 and 304. The user profile information may be used by the communication managers 120 and 128 for controlling communications to the respective mobile computing device. Further, the user profile information may be used by the communication managers 120 and 128 for notifying a user of communication requests. In this way, a user of a mobile computing device is provided with a measure of control over communications to the mobile computing device. A user profile may include, for example, but not be limited to, one or more identifiers for communicating with the user, presence information, communication channel information, and the like. Identifiers for communicating with a user may include, but is not limited to, one or more phone numbers and/or one or more email addresses for communicating with the user. Presence information includes one or more status indicators that convey ability and willingness of a user to communicate. For example, presence information may indicate when a user is available for communication and/or when a user is unavailable for communication. The communication channel information may indicate communication channel preferences for a user, such as, one or more preferred communication channels for the user. For example, a communication channel preference may indicate that email communication is preferred over voice communication, or communication via one telephone number is preferred over another telephone number. As will be described in further detail herein, user profile information may be used for controlling communication requests and communications to the user.

The communication managers 120 and 128 may store communication requests in a respective request store 112. A communication request may be received from users desiring to communicate with the user of a recipient mobile computing device. For example, the mobile computing device 302 may receive a communication request from the mobile computing device 304. In this example, the requester may use the mobile computing device 304 for sending a communication request to the mobile computing device 302. The communication request may identify a proposed timing of a communication and/or a proposed communication channel for the communication. For example, the communication request may indicate a proposed time period (e.g., date and time) for a communication. The communication request may also indicate that, for example, email is the proposed communication channel. One or more communication channels may be proposed for communication with the intended recipient. For example, the proposed communication channels may include, but are not limited to, a call, text message, instant message, social network communications, the like, and combinations thereof. As will be described in further detail herein, communication request parameters, such as a proposed timing of a communication and a proposed communication channel for a communication, may be used for controlling communication requests and communications to an intended recipient of a communication.

The operation of the mobile computing device 304 for sending a communication request and the mobile computing device 302 for receiving the communication request can be described by the following example. As shown in FIG. 3, the mobile computing devices 302 and 304 each include various functional components and data stores 110 and 112 to facilitate the operation. The operation of the disclosed methods may be implemented using components other than as shown in FIG. 3. The mobile computing devices 302 and 304 may each use the I/O module 122 and 130, respectively, for interacting with the network(s) 104 and various computing devices communicatively connected to the network(s) 104.

In this example, the communication managers 120 and 128 of the mobile computing devices 302 and 304, respectively, may each be one or more modules implemented with software and/or hardware configured to receive communication requests and to initiate communications, as well as other functions described herein. For ease of illustration, the communication managers 120 and 128 are each only graphically shown in FIG. 3 as a single component; although, the communication managers 120 and 128 may each be implemented with one or more combinations of hardware, software, and firmware.

Figure 4:
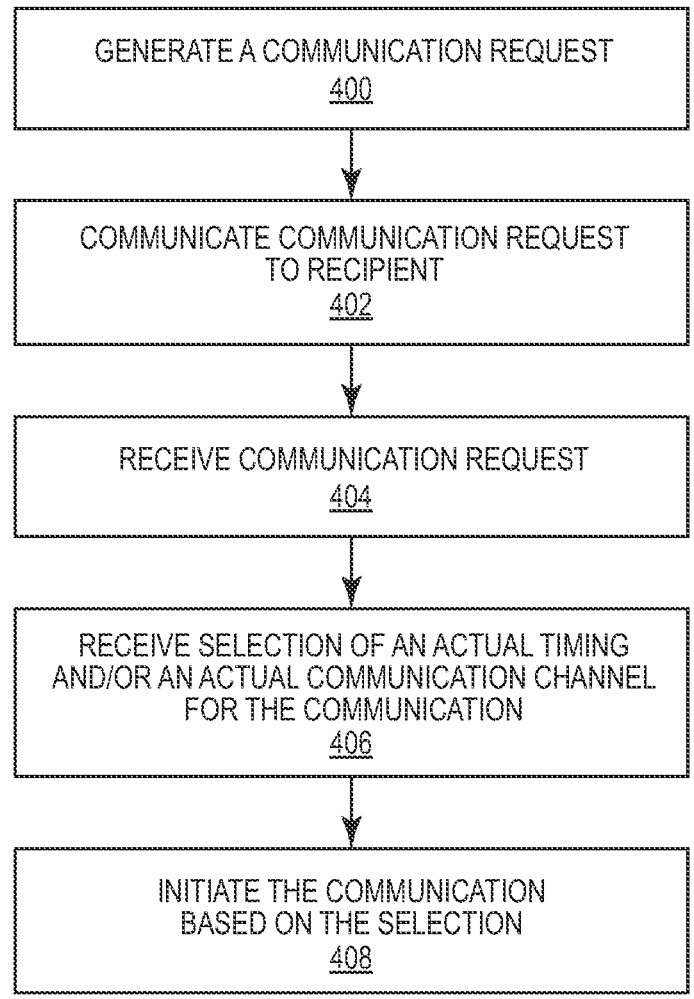
FIG. 4 is a flow chart of an exemplary method for enabling recipient control of communications according to embodiments of the present disclosure.

FIG. 4 illustrates a flow chart of an exemplary method for enabling recipient control of communications according to embodiments of the present disclosure. In this example, reference is made to the mobile computing devices 302 and 304 shown in FIG. 3 for purposes of illustration; however, reference to the mobile computing devices 302 and 304 should not be construed as limiting, and it should be appreciated that the method may be implemented by any suitable computing devices.

Referring to FIG. 4, the method includes generating a communication request (step 400). For example, a communication request may be generated at the mobile computing device 304. The communication request may identify a proposed timing of a communication and/or a proposed communication channel for the communication. The user of the mobile computing device 304 may interact with the interface 126 for controlling the communication manager 128 to generate the communication request identifying a recipient. For example, the user of the mobile computing device 304 may select the recipient by interaction with the device 304. In response to generation of the communication request, the communication request is communicated to a recipient (step 402). For example, the communication manager 128 may control the interface 126 to communicate the communication request to the mobile computing device 302 via the network(s) 104.

Referring to FIG. 4, the method includes receiving the communication request (step 404). Continuing the aforementioned example, the mobile computing device 302 may receive the communication request from the mobile computing device 304. In an example, a notification of the communication request may be displayed to a user via the interface 118 in response to receipt of the communication request. In another example, the communication request may be stored in the request store 112 and displayed to the user at a later time. In one example, the communication request may be displayed to the user via the interface 118 in response to entry of input for accessing stored communication requests. In another example, the communication request may be displayed to the user via the interface 118 based on criteria contained with the communication request. For instance, the communication request may be displayed prior to the request timing out.

The method of FIG. 4 includes receiving selection of an actual timing and/or actual communication channel for the communication (step 406). In an example, the user may enter selection of an actual timing and/or actual communication channel for the communication. In another example, an actual timing and/or actual communication channel may be automatically selected by the communication manager 120 based on user profile information stored at the mobile computing device 302. The selection may also be based on a timeout, priority, the like, and combinations thereof.

Referring to FIG. 4, the method includes initiating the communication based on the selection (step 408). For example, the communication manager 120 may initiate a call with the mobile computing device 304. Further, for example, the call may be initiated at a time specified by the selection.

In accordance with embodiments of the present disclosure, a communication may be initiated automatically prior to expiration of a proposed time period. For example, a communication request may identify a proposed time period for a communication. A server or mobile computing device may receive the communication request in accordance with the present disclosure. A communication manager at a server or a communication manager at a mobile computing device may initiate the communication prior to expiration of the proposed time period if the communication has not already been initiated or canceled by a recipient of the communication request.

In accordance with embodiments of the present disclosure, a communication may be automatically initiated with a requester of the communication based on a status of a device receiving a communication request. For example, a communication request may be received at a server or mobile computing device in accordance with the present disclosure. In this example, the communication may be automatically initiated based on, for example, whether presence information indicates that the user is available for communication. A communication manager of a server or a mobile computing device may determine that the recipient is available for communication at a mobile device. In response to determining that the recipient is available, the communication manager may automatically initiate the communication, such as, for example, a call between a device of the requester and the available device of the recipient.

In accordance with embodiments of the present disclosure, a response message may automatically be communicated to a requester or originator of a communication request in response to receiving the communication request. For example, a server or mobile computing device may store one or more predefined response messages for use in responding to communication requests. A response message may specify one or more parameters for a requested communication. The parameter(s) may be specified by a recipient of a request. For example, the recipient may input user input for selecting one or more parameters (e.g., a timing and/or communication channel) for a communication. A communication manager of a server or mobile computing device may receive the specified parameter(s). In response to receipt of a communication request, the communication manager may automatically communicate to a request originator a response message including the specified parameters(s). In an alternative, one or more of the parameters may be automatically determined by the communication manager. For example, the parameter(s) may be automatically determined based on user profile information.

In accordance with embodiments of the present disclosure, a recipient of a communication request may be notified if a response to the request is not initiated within a predefined time interval. For example, a server or mobile computing device may receive a communication request as described herein. The communication manager of the server or mobile computing device may determine whether a requested communication is initiated within a predefined time interval. In response to determining that the communication is not initiated within the predefined time interval, the communication manager may generate a notification for reminding the recipient of the request. For example, the communication manager of the server may send a notification message to a computing device of the recipient for display to the recipient. In another example, the communication manager of the mobile computing device may generate a notification and may display the notification to the recipient. The notification may specify the communication request, details of the request, and a time of receipt of the communication request.

In accordance with embodiments of the present disclosure, a communication request may identify an importance level for a requested communication. The requester may specify an importance level for the communication request. Requests having a low importance level may be given a low priority. In contrast, requests having a high importance level may be given a high priority. Communication requests of different importance levels may be handled differently by a server or mobile computing device. For example, a communication request having low importance may be stored for later retrieval by a recipient. In contrast, for example, a recipient may be notified immediately of a communication request having high importance, such as, by automatically displaying a notification of the communication request in response to receipt of the communication request.

In accordance with embodiments of the present disclosure, a communication request may identify an aggressiveness level for a requested communication. The requester may specify an aggressiveness level for the communication request. Initiation of a communication may be based on the aggressiveness level. Initiation of a communication associated with a low aggressiveness level may be attempted through a low number of techniques and/or a lower number of times. In contrast, initiation of a communication associated with a high aggressiveness level may be attempted through a high number of techniques and/or a high number of times. For example, in a low aggressiveness level scenario, the communication may only be initiated via email, whereas in a high aggressiveness level scenario, the communication may be initiated via email and two or more telephone calls.

In accordance with embodiments of the present disclosure, initiation of a communication may be prioritized. For example, as described herein, communication requests may indicate an importance level for a requested communication. The initiation of the communication may be prioritized based on the indicated importance level. Communications with a higher importance level than others can be given a higher priority than the others. In contrast, communications with a lower importance level than others can be given a lower priority than the others. The high priority communications can be initiated prior to the lower priority communications. Various other factors as described herein may be used for prioritizing communications.

In accordance with embodiments of the present disclosure, an intended recipient of a communication request may be notified of the request based on a condition of device of the intended recipient. For example, the communication request and/or an intended recipient may specify one or more conditional parameters by which the communication request is to be delivered. Example conditional parameters include, but are not limited to, a location of a recipient or a device of the recipient, a time period, a status of the recipient or a device of the recipient, the like, and combinations thereof. In an example, a communication request may specify that a recipient device may be notified of the request only if the device is at or near a specified location. In another example, a communication request may specify that a recipient device may be notified of the request only during a specified time period. In yet another example, a communication request may specify that a recipient device may be notified of the request only when the intended recipient is not traveling (e.g., the intended recipient is not driving). If a conditional parameter of a communication request is not met on receipt at a server or mobile computing device, the communication request may be stored while the condition is periodically checked. If the condition is met, a notification may be presented to the intended recipient. If the condition is not met within a predefined time period, the communication request may be deleted or canceled.

In another example of applying conditions specified by a requester and/or an intended recipient, a communication may be initiated based on whether a recipient device meets a specified condition. For example, a communication manager of a server or mobile computing device may determine whether a specified condition is met. In response to determining that the condition is met, the communication manager may initiate the communication. If a condition is not met on receipt at a server or mobile computing device, the communication request may be stored while the condition is periodically checked. If the condition is eventually met, the communication may be initiated. If the condition is not met within a predefined time period, the communication request may be deleted or canceled.

In another example of applying conditions to a communication request, another communication request may be communicated to another recipient in response to determining that a conditional parameter is not met. For example, the server 102 shown in FIG. 1 may receive a communication request indicating a primary recipient and another recipient. The communication manager 108 may determine that one or more conditional parameters for the primary recipient are not met. In response to determining that the conditional parameter(s) are not met, a communication request may be sent to a device associated with the other recipient. The original communication request may also be sent to the primary recipient.

Figure 5:
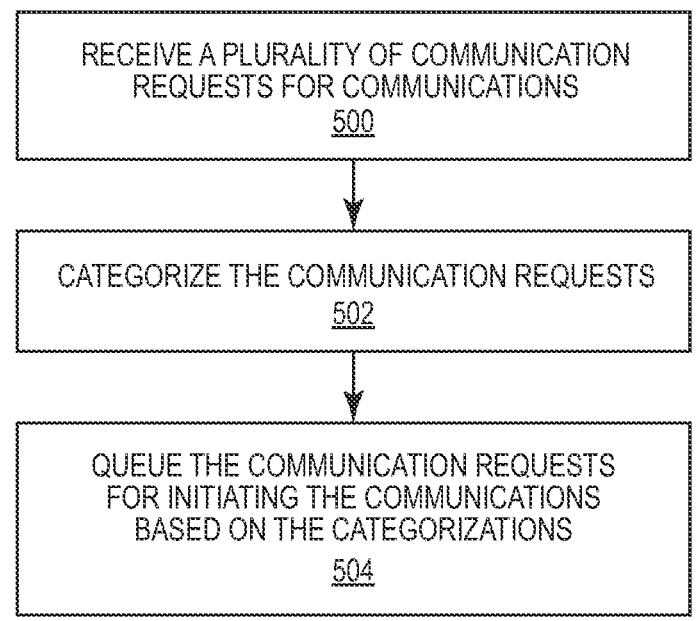
FIG. 5 is a flow chart of an exemplary method for queuing communication requests for initiating communications according to embodiments of the present disclosure.

In accordance with embodiments of the present disclosure, a server or a mobile computing device may receive multiple communication requests for communications with an intended recipient. The server or mobile computing device may queue the communication requests for initiating communications. In an example, FIG. 5 illustrates a flow chart of an exemplary method for queuing communication requests for initiating communications according to embodiments of the present disclosure. In this example, reference is made to the mobile computing devices 302 and 304 shown in FIG. 3 for purposes of illustration; however, reference to the mobile computing devices 302 and 304 should not be construed as limiting, and it should be appreciated that the method may be implemented by any suitable computing devices.

Referring to FIG. 5, the method includes receiving a plurality of communication requests for communications (step 500). For example, referring to FIG. 3, mobile computing devices 304 and 306 may each communicate one or more communication requests to the mobile computing device 302. The communication manager 120 may receive the communication requests and may store the communication requests in the request store 112.

The method of FIG. 5 includes categorizing the communication requests (step 502). For example, one or more received communication requests may identify an importance level. In this example, the communication manager 120 may categorize the communication requests based on the importance level(s). For example, high and low importance communication requests may be placed in different categories.

In another example of categorizing communication requests, one or more received communication requests may identify a proposed timing of a communication (or proposed time period) and/or a proposed communication channel for the communication. In this example, the communication manager 120 may categorize the communication requests based on the proposed timing of the communication and/or a proposed communication channel. For example, communication requests identifying a timing that is closer in time may be categorized differently than later timed communication requests. Further, for example, requests identifying calls may be categorized differently than requests identifying emails.

In yet another example of categorizing communication requests, received communication requests may be categorized based on identities of requesters, a current location of a recipient of the communication requests, a context of the communication requests, a timing, urgency, the like, and combinations thereof.

The method of FIG. 5 includes queuing the communication requests for initiating the communications based on the categorizations (step 504). For example, the communication manager 120 may queue the communication requests for initiating communications based on categorizations of the requests. Categorizations of certain types may be placed higher in the queue than others. The process of queuing communication requests may include placing the communication requests in a queue and initiating the communications in accordance with the queue. Further, for example, the communication manager 120 may control the interface 118 to notify the recipient of communication requests and information related to a queue, such as an ordering of communications in the queue.

In accordance with embodiments of the present disclosure, a communication request may identify multiple communication recipients for receipt of one or more communications. For example, referring to FIG. 1, the mobile computing device 124 may generate a communication request identifying intended recipients at mobile computing devices 114, 116, and 132. The communication request may identify users associated with the mobile computing devices. Further, the communication request may identify selection of timing and/or a communication channel for one or more communications with the identified recipients. The communication request may be communicated to the server 102, where the communication manager 108 manages notifying the recipients of the communication request and/or storing the communication request in the request store 112 for access by the recipients. Further, the communication manager 108 may initiate one or more communications with one or more of the recipients. Initiation of the communication(s) may be implemented in accordance with embodiments of the present disclosure. For example, the communications may be initiated based on conditions, status of one or more devices, user inputs, applications running on the devices, locations of the devices, and the like as described herein.

In an embodiment, in response to initiating a communication with one or more of intended recipients, the communication manager 108 may successfully communicate with one of the intended recipients. The communication manager 108 may determine that the communication was successful. In response to determining that the communication was successful, the communication manager 108 may cancel the communication request such that communications are not initiated with any of the other intended recipients. In this case, it may be that the initiator of the communication only needed to communicate with one of the intended recipients; thus, once communication was established with one of them, any communication attempts to the others became unnecessary. Further, in response to determining that an attempted communication with an intended recipient does not occur, a communication with one or more of the other recipients may be initiated.

Figure 6:
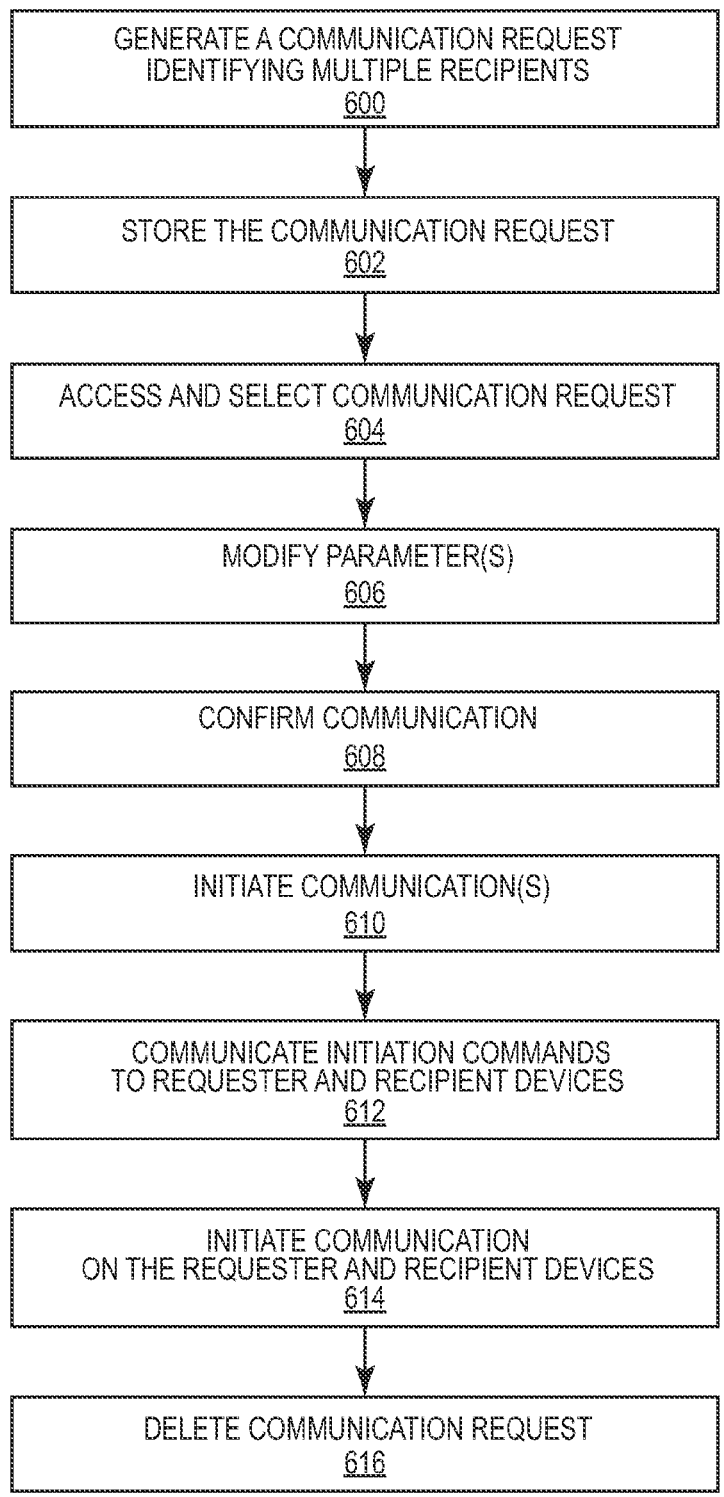
FIG. 6 is a flow chart of an exemplary method for requesting communication with multiple recipients according to embodiments of the present disclosure.

FIG. 6 illustrates a flow chart of an exemplary method for requesting communication with multiple recipients according to embodiments of the present disclosure. In this example, reference is made to the server 102 shown in FIG. 1 for purposes of illustration; however, reference to the server 102 should not be construed as limiting, and it should be appreciated that the method may be implemented by any suitable computing device.

Referring to FIG. 6, the method includes generating a communication request identifying multiple intended recipients (step 600). For example, the mobile computing device 124 may generate a communication request identifying multiple intended recipients, including, for example, a recipient associated with the mobile computing device 114. The communication request may also identify various parameters, such as, a proposed time of the communication and a proposed communication channel. Further, the mobile computing device 124 may communicate the request to the server 102, and the communication manager 108 may store the request in the request store 112 (step 602).

The method of FIG. 6 includes accessing and selecting the communication request (step 604). For example, the communication manager 120 may control the I/O module 122 to access the server 102 for retrieving a communication request. In this example, the communication request may be retrieved and displayed to the user of the mobile computing device 114 via a display of the interface 118. The user may use the interface 118 to select a proposed timing and communication channel for the communication. Alternatively, the user may use the interface 118 to change the proposed parameters by selecting another time and communication channel for the communication (step 606). In an alternative, rather than user selection of the proposed timing and communication channel, the communication manager 120 may automatically select the proposed timing and communication channel based on defined parameters.

After selecting communication parameters, the method of FIG. 6 includes confirming the communication (step 608). A message indicating confirmation of the communication may be sent to the server 102. Alternatively, the communication request may be denied by a recipient of the request. Requested communications may be confirmed or denied by the communication request recipients.

The method of FIG. 6 includes initiating communication(s) to intended recipients providing communication confirmation (step 610). The communication may be initiated by communicating initiation commands to the requester and recipient devices (step 612). On receipt of the initiation commands, the communication may be initiated on the requester and recipient devices (step 614). For example, the communication manager 108 may control initiation of one or more communications to intended recipients confirming the communication. For example, a call between the requester and the recipient(s) may be initiated by the communication manager 108. After initiation of the communication, the communication manager 108 may delete the communication request (step 616).

Figure 7:
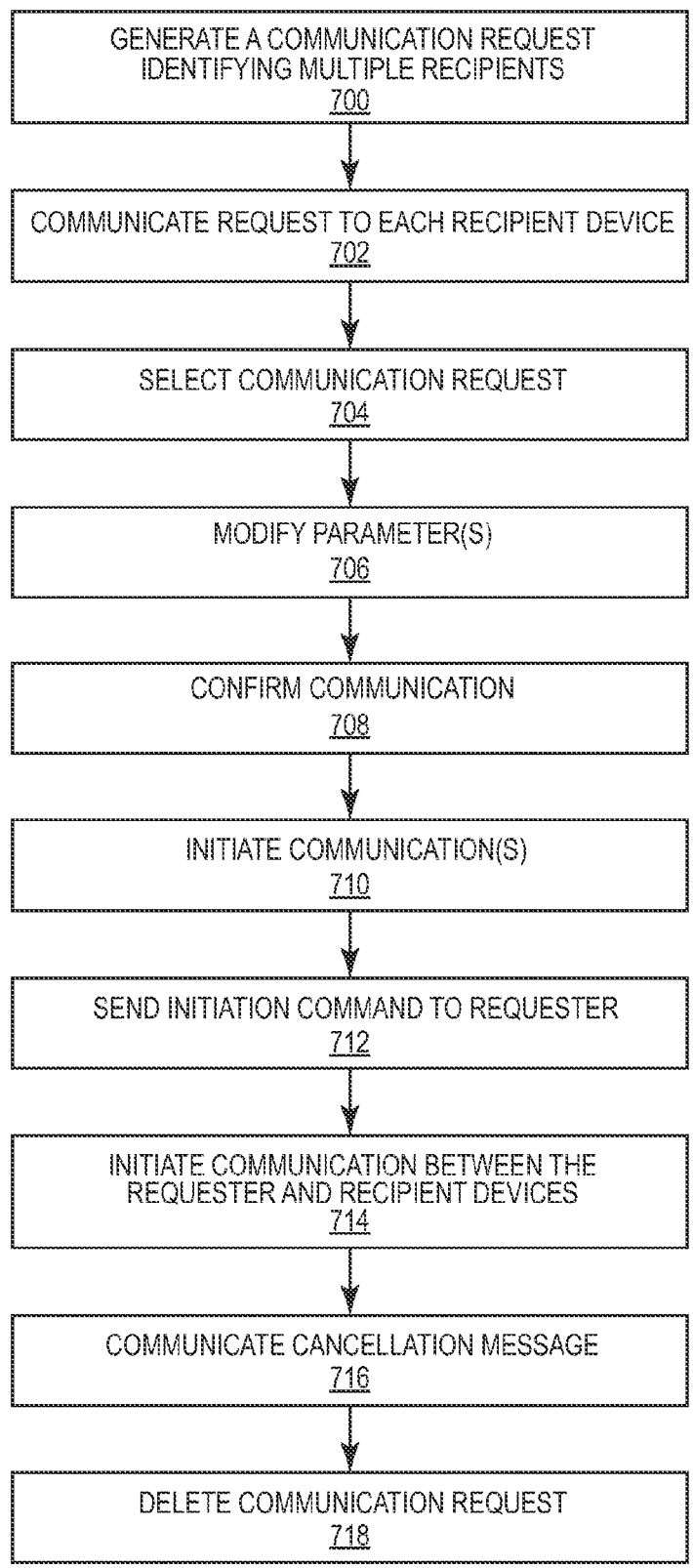
FIG. 7 is a flow chart of another exemplary method for requesting communication with multiple recipients according to embodiments of the present disclosure.

FIG. 7 illustrates a flow chart of another exemplary method for requesting communication with multiple recipients according to embodiments of the present disclosure. In this example, reference is made to the mobile computing device 302 shown in FIG. 3 for purposes of illustration; however, reference to the mobile computing device 302 should not be construed as limiting, and it should be appreciated that the method may be implemented by any suitable computing device.

The method of FIG. 7 includes generating a communication request identifying multiple recipients (step 700). For example, the mobile computing device 304 may generate a communication request identifying multiple intended recipients, including a recipient associated with the mobile computing device 302. The communication request may also identify various parameters, such as, a proposed time of the communication and a proposed communication channel. The mobile computing device 304 may communicate the communication request to each recipient device (step 702). For example, the communication request may be communicated to the mobile computing device 302 and other computing devices (not shown).

The method of FIG. 7 includes selecting the communication request (step 704). For example, the communication manager 120 of the mobile computing device 302 may display the communication request to the user via a display of the interface 118. The user may use the interface 118 to select a proposed timing and communication channel for the communication. Alternatively, the user may use the interface 118 to change the proposed parameters by selecting another time and communication channel for the communication (step 706). After selecting communication parameters, the method of FIG. 7 includes confirming the communication (step 708). In an alternative, rather than user selection of the proposed timing and communication channel, the communication manager 120 may automatically select the proposed timing and communication channel based on defined parameters.

The method of FIG. 7 includes sending an initiation command to the requester (step 712). For example, the communication manager 120 can control generation of an initiation command for initiating communication with the requester. The initiation command may be communicated to the mobile computing device 304. Next, the method includes initiating communication between the requester and recipient devices (step 714). For example, in response to receipt of the initiation command, the mobile computing device 304 may call the mobile computing device 302.

The method of FIG. 7 includes communicating a cancellation message to other recipient devices (step 716). For example, the mobile computing device 302 may communicate a cancellation message to other devices identified in the communication request. In response to receipt of the cancellation message, the devices may delete the communication request (step 718).

Figure 8:
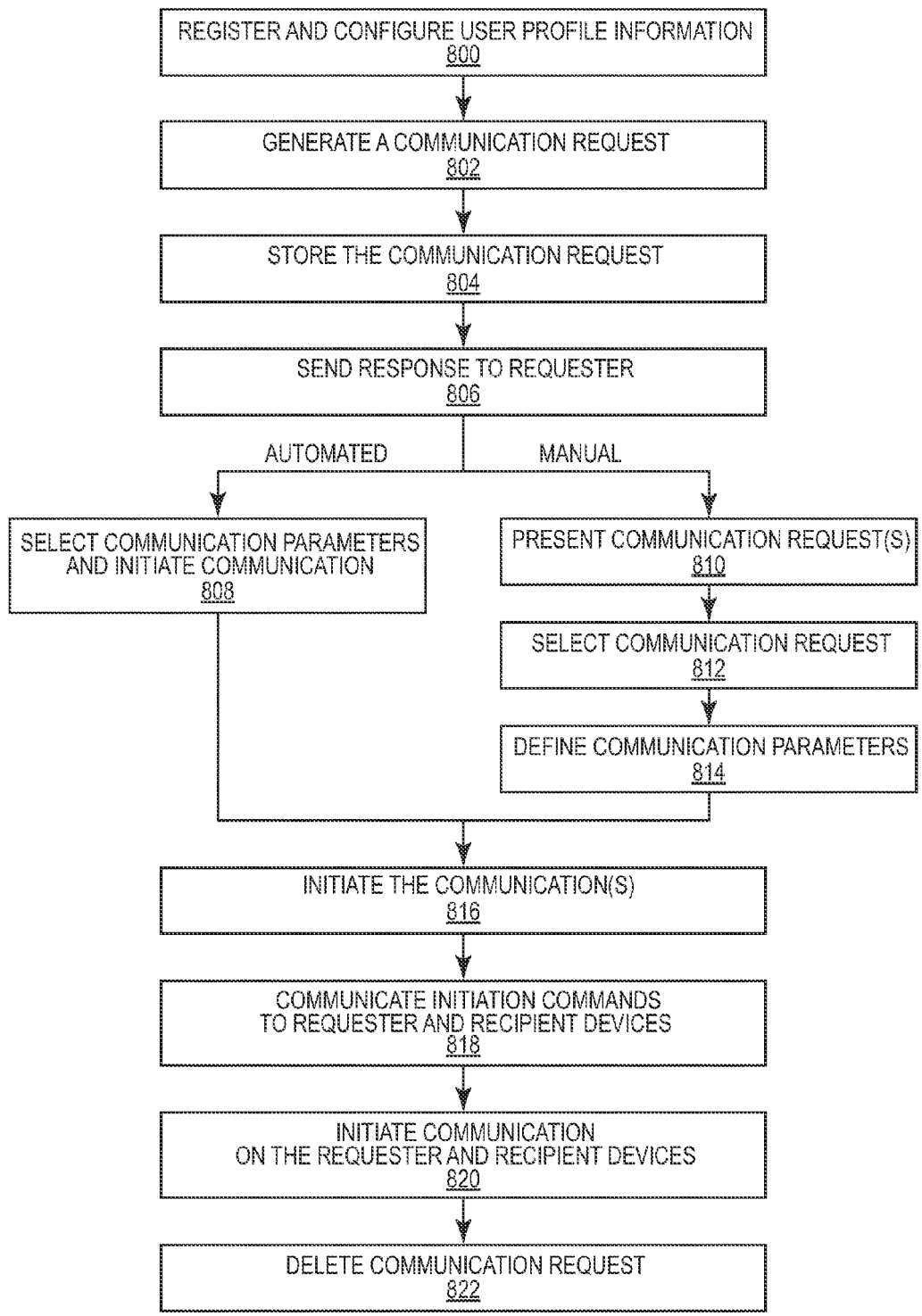
FIG. 8 is a flow chart of another example method for controlling communications according to embodiments of the present disclosure.

FIG. 8 illustrates a flow chart of another example method for controlling communications according to embodiments of the present disclosure. In this example, reference is made to the system 100 shown in FIG. 1 for purposes of illustration; however, reference to the system 100 should not be construed as limiting, and it should be appreciated that the method may be implemented by any suitable computing devices.

Referring to FIG. 8, the method includes registering and configuring user profile information (step 800). For example, a user of the mobile computing device 114 may use the interface 118 to control the mobile computing device 114 to access the server 102 to register for communication services. The mobile computing device 114 and the server 102 may exchange messages to process the registration. Further, the user may use the interface 118 to enter user profile information, and the communication manager 120 may communicate one or more messages to the server 102 that include the user profile information. The server 102 may receive the user profile information and may store the information in the user profile store 110.

The method of FIG. 8 includes generating a communication request (step 802). For example, the mobile computing device 124 may generate a communication request and may send the communication request to the server 102. The server 102 may store the communication request (step 804). Further, in response to receipt of the communication request, the server 102 may send a response to the requester device (step 806). For example, the server 102 may send an acknowledgement response to the mobile computing device 124. Communication of the response to the requester device is optional.

After step 806, the server may automatically select communication parameters and initiate a communication based on the communication request (step 808). Alternatively, the method of FIG. 8 includes presenting the intended recipient with the communication request for manual selection of the communication parameters (step 810). Steps 810, 812, and 814 correspond to manual selection of the communication parameters, whereas step 806 corresponds to automatic selection of the communication parameters. The method may implement either step 806 for automatic selection, or steps 810, 812, and 814 for manual selection.

The method of FIG. 8 includes receiving selection of the communication request (step 812). For example, the communication request originating from the mobile computing device 124 may be one of multiple communication requests presented to the intended recipient. In this example, the intended recipient may select the communication request that originated from the mobile computing device 124. Further, the method of FIG. 8 includes receiving user input for defining communication parameters (step 814). For example, the user of the mobile computing device 114 may enter input for selecting communication parameters, such as a timing and communication channel, for a communication. The mobile computing device 114 may communicate the parameters to the server 102 for initiating the communication.

The method of FIG. 8 includes initiating the communication (step 816). For example, a call may be initiated by communicating initiation commands to the requester and recipient devices (step 818). On receipt of the initiation commands, the communication may be initiated on the requester and recipient devices (step 820). For example, the communication manager 108 may control initiation of one or more communications to intended recipients confirming the communication. For example, a call between the requester and the recipient(s) may be initiated by the communication manager 108. After initiation of the communication, the communication manager 108 may delete the communication request (step 822).

Figure 9:
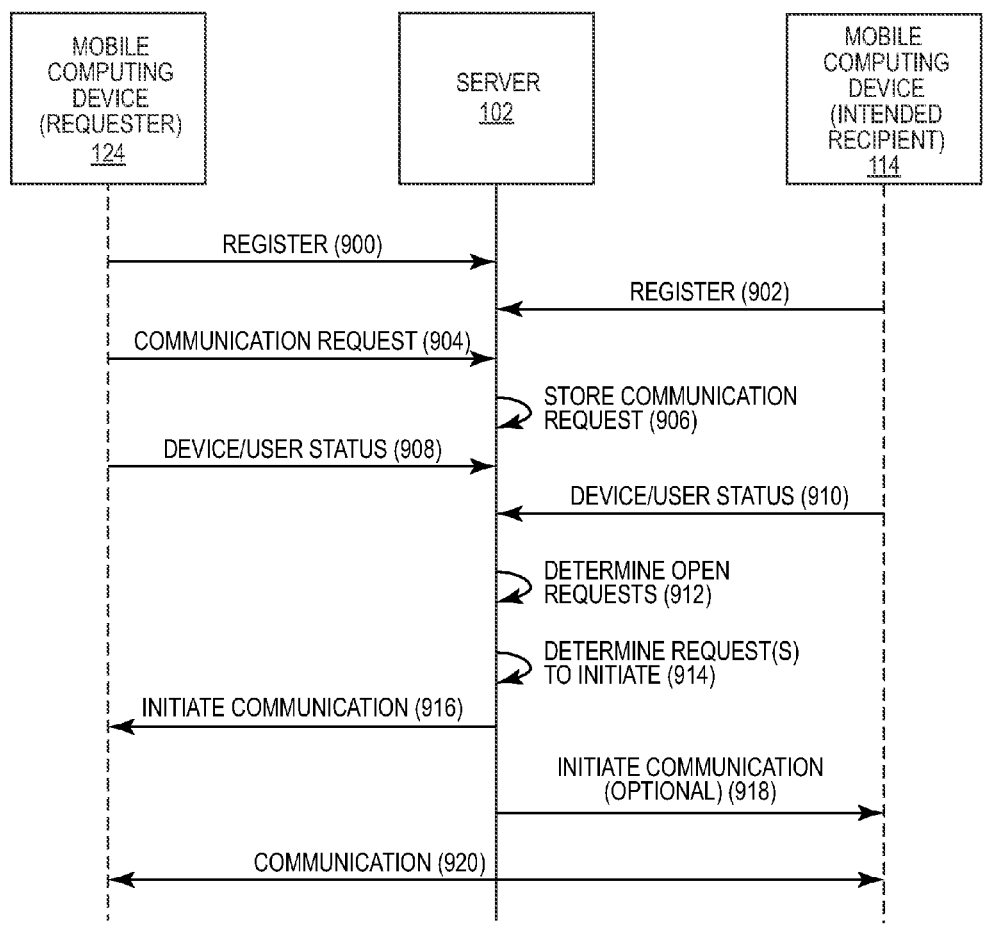
FIG. 9 is a message flow diagram of an exemplary operation of the system of FIG. 1 according to embodiments of the present disclosure.

In an example, FIG. 9 illustrates a message flow diagram of an exemplary operation of the system 100 of FIG. 1 according to embodiments of the present disclosure. Referring to FIG. 9, the mobile computing device 124 may communicate a register message to the server 102 to register for communication management services provided by the server 102 (step 900). The register message and/or one or more other messages communicated by the mobile computing device 124 to the server 102 may include user profile information for a user of the mobile computing device 124. Similarly, the mobile computing device 114 may communicate a register message to the server 102 to register for communication services provided by the server 102 (step 902). The register message and/or one or more other messages communicated by the mobile computing device 114 to the server 102 may include user profile information for a user of the mobile computing device 114.

At step 904 of FIG. 9, the mobile computing device 124 may communicate a communication request to the server 102 for requesting a communication with an intended recipient (step 904). In this example, the intended recipient is a user of the mobile computing device 114. In response to receipt of the communication request, the server 102 stores the communication request in a data store, such as the request store 112 (step 906).

At steps 908 and 910, mobile computing devices 114 and 124 may communicate device/user status information to the server 102. The status information may include parameters that indicate whether the devices are capable and/or ready to communicate in accordance with a communication request. For example, the status information may indicate that the devices are available for communications.

At step 912, the server 102 may determine open requests. For example, the server 102 may determine whether there are any communication requests. In this example, in response to determining that there are one or more open requests, the server 102 may identify which device (or recipient) is identified by the request(s) (e.g., the request identifies either mobile computing device 114 or mobile computing device 124). Further, for example, the server 102 may determine that the communication request sent to the server 102 in step 904 is open. In response to determining that the communication request is open, the server 102 may determine one or more communication requests to initiate (step 914). For example, in response to determining that the communication request sent to the server 102 in step 904 meets one or more conditions and/or criteria, the server 102 may initiate a communication between the mobile computing device 114 and the mobile computing device 124 (steps 916 and 918). For example, the server 102 may initiate a call between the devices. Next, at step 920, the communication (e.g., a call) may be established between the mobile computing devices 114 and 124. It should be noted that step 918 may be optional and unnecessary in the case where a communication is one-way to an intended recipient such as, for example, an email communication.

Figure 10:
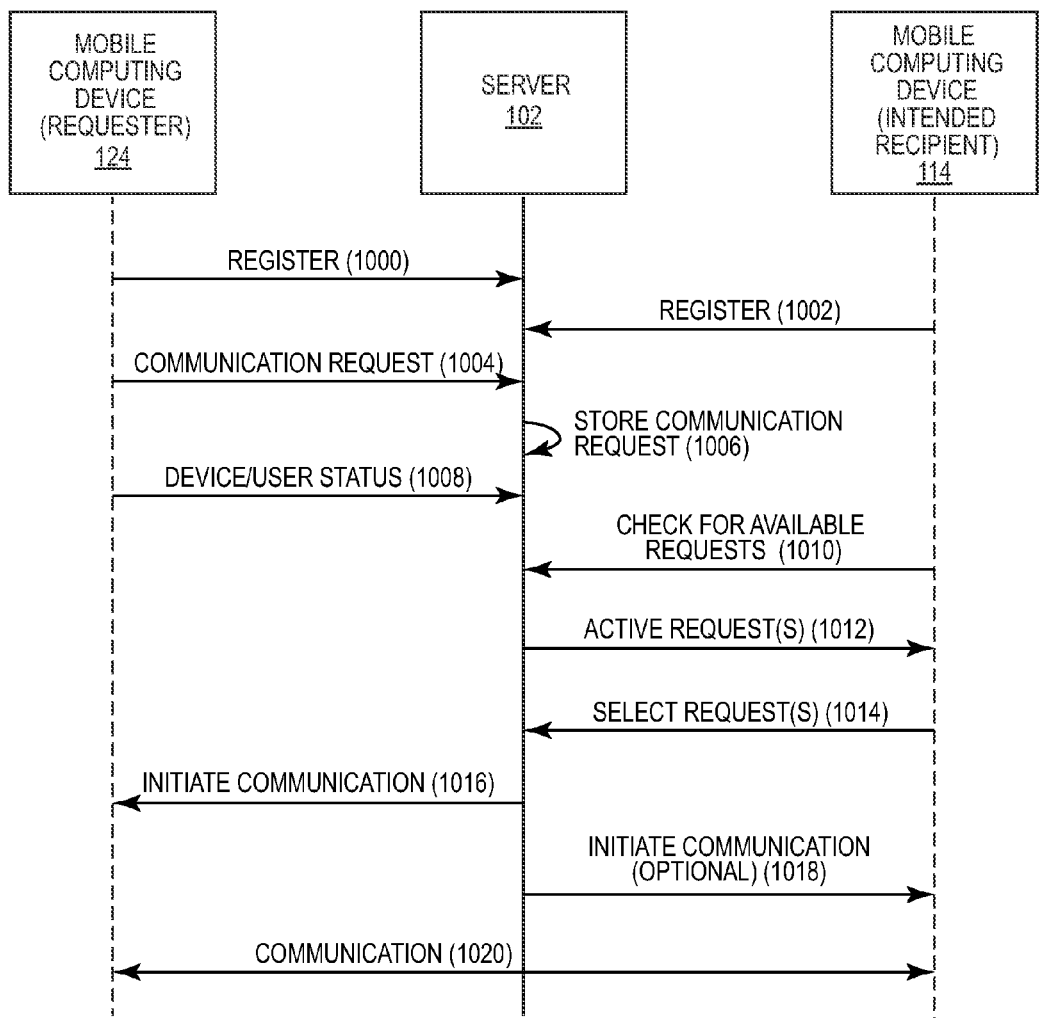
FIG. 10 is a message flow diagram of an exemplary operation of the system of FIG. 1 according to embodiments of the present disclosure.

In another message flow example, FIG. 10 illustrates a message flow diagram of an exemplary operation of the system 100 of FIG. 1 according to embodiments of the present disclosure. Referring to FIG. 10, the mobile computing device 124 may communicate a register message to the server 102 to register for communication management services provided by the server 102 (step 1000). The register message and/or one or more other messages communicated by the mobile computing device 124 to the server 102 may include user profile information for a user of the mobile computing device 124. Similarly, the mobile computing device 114 may communicate a register message to the server 102 to register for communication services provided by the server 102 (step 1002). The register message and/or one or more other messages communicated by the mobile computing device 114 to the server 102 may include user profile information for a user of the mobile computing device 124.

At step 1004 of FIG. 10, the mobile computing device 124 may communicate a communication request to the server 102 for requesting a communication with an intended recipient (step 1004). In this example, the intended recipient is a user of the mobile computing device 114. In response to receipt of the communication request, the server 102 stores the communication request in a data store, such as the request store 112 (step 1006). At step 1008, the mobile computing device 124 may communicate device/user status information to the server 102.

At step 1010, the mobile computing device 114 may send a message to the server 102 to check for available communication requests for the user of the mobile computing device 114. In response to receipt of the message sent at step 1010, the server 102 may retrieve active communication request(s) (if any) for the mobile computing device 114 and communicate the communication request(s) to the mobile computing device 114 (step 1012). For example, the server 102 may send the communication request of step 1004 to the mobile computing device 114.

At step 1014, the mobile computing device 114 may communicate a message to the server 102 for selecting the request. In response to receipt of the message for selecting the request, the server 102 may initiate a communication between the mobile computing device 114 and the mobile computing device 124 (steps 1016 and 1018). Next, at step 1020, the communication (e.g., a call) may be established between the mobile computing devices 114 and 124. It should be noted that step 1018 may be optional and unnecessary in the case where a communication is one-way to an intended recipient such as, for example, an email communication.

Figure 11:
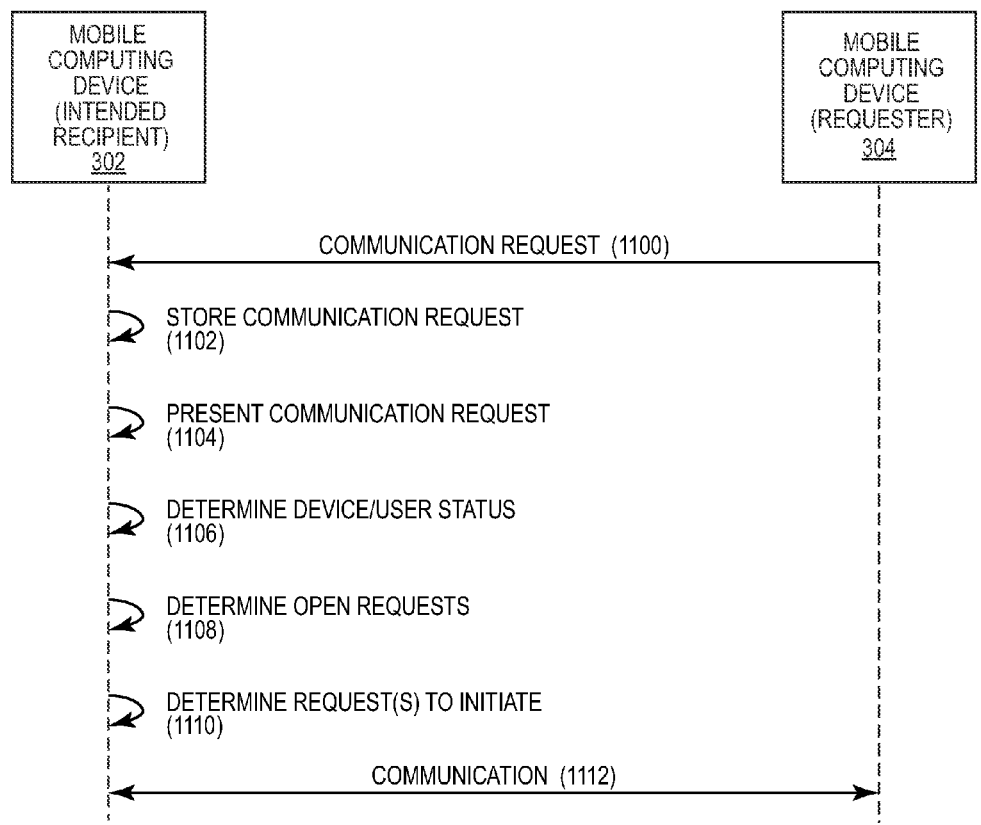
FIG. 11 is a message flow diagram of an exemplary operation of the system of FIG. 3 according to embodiments of the present disclosure.

FIG. 11 is a message flow diagram of an exemplary operation of the system 300 of FIG. 3 according to embodiments of the present disclosure. Referring to FIG. 11, the mobile computing device 304 may communicate a communication request to the mobile computing device 302 (step 1100). For example, the communication request may be sent to the mobile computing device 302 via the network(s) 104. The communication request may identify a proposed timing of a communication and/or a proposed communication channel for the communication. The mobile computing device 302 may store the communication request (step 1102) and may present the request to the user (step 1104).

At step 1106, the mobile computing device 302 may determine device/user status information, such as parameters indicating whether the device is capable and/or ready to communicate in accordance with a communication request. At step 1108, the mobile computing device 302 may determine open requests. For example, the mobile computing device 302 may determine whether there are any communication requests. In this example, in response to determining that there are open communication requests, the mobile computing device 302 may determine one or more communication requests to initiate (step 1110). For example, in response to determining that the communication request sent to the mobile computing device 302 in step 1100 meets one or more conditions and/or criteria, the communication (e.g., a call) may be established between the mobile computing devices 302 and 304 (step 1112). In an example, the communication may be established in accordance with the proposed timing and proposed communication channel.

Figure 12:
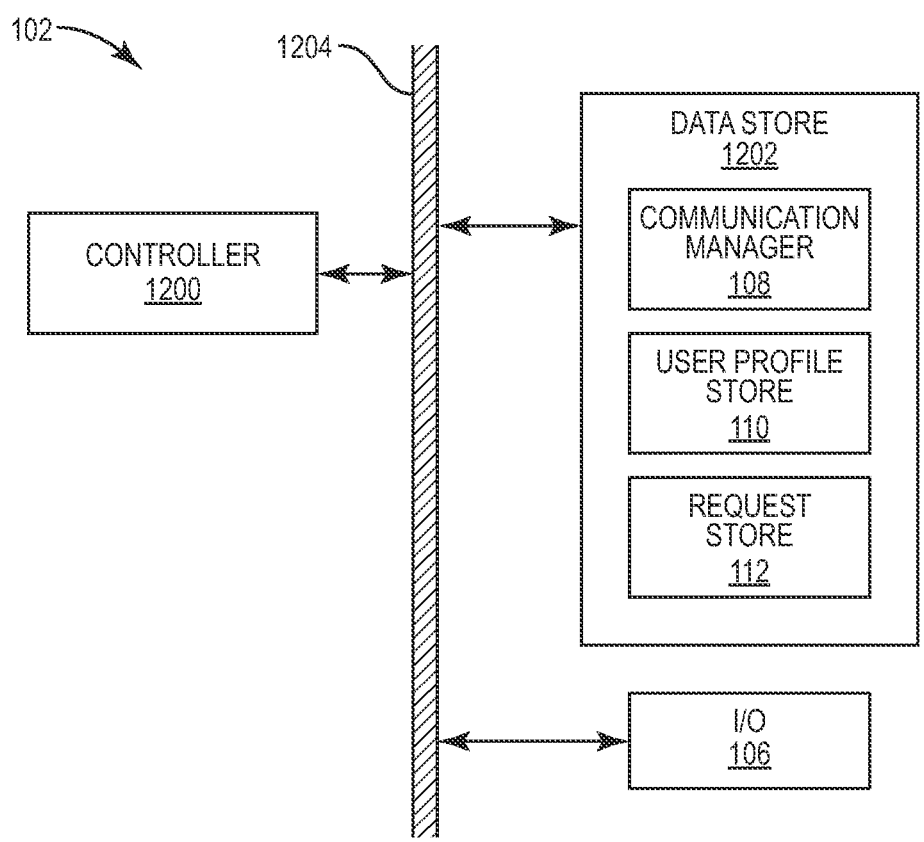
FIG. 12 is a block diagram of the server shown in FIG. 1 according to embodiments of the present disclosure.

FIG. 12 is a block diagram of the server 102 shown in FIG. 1 according to embodiments of the present disclosure. Referring to FIG. 12, the server 102 may include a controller 1200 connected to a data store 1202 and an I/O module 106 by a bus 1204 or similar mechanism. The data store 1202 includes the communication manager 108, the user profile store 110, and the request store 112. The controller 1200 may be a microprocessor, digital ASIC, FPGA, or the like. In this example, the controller 1200 is a microprocessor, and the communication manager 108 is implemented in software and may be stored in the data store 1202 for execution by the controller 1200. The I/O module 106 may be a local wireless interface such as a wireless interface operating according to one of the suite of IEEE 802.11 standards, a mobile communications interface such as a cellular telecommunications interface, or the like.

Figure 13:
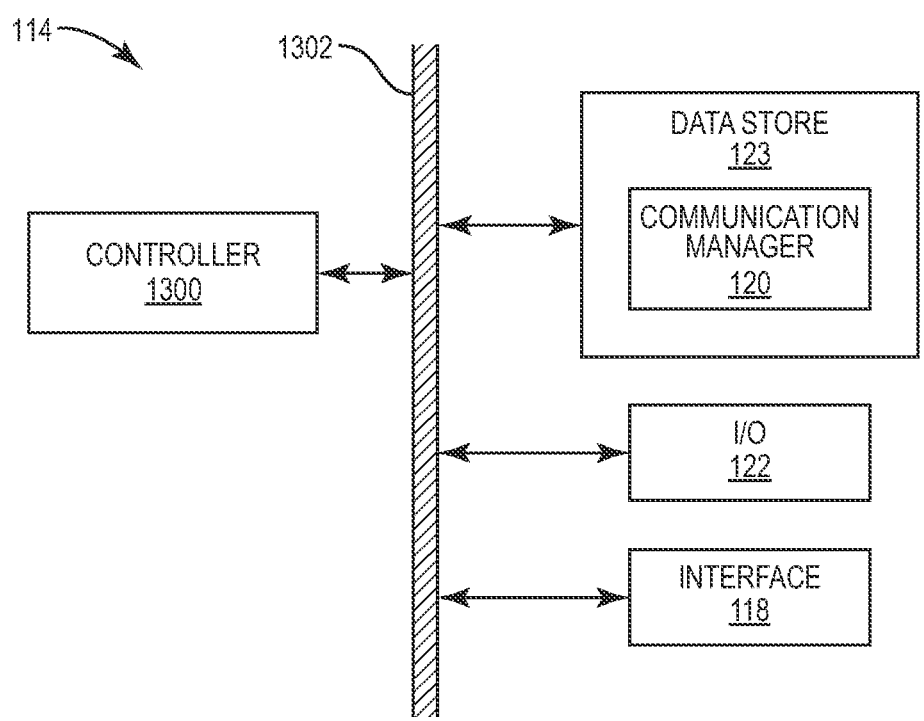
FIG. 13 is a block diagram of a mobile computing device shown in FIG. 1 according to embodiments of the present disclosure.

FIG. 13 is a block diagram of the mobile computing device 114 shown in FIG. 1 according to embodiments of the present disclosure. Alternatively, the block diagram may depict the mobile computing device 124 shown in FIG. 1. Referring to FIG. 13, the mobile computing device 114 may include a controller 1300 connected to the data store 123, the I/O module 122, and the interface 118 by a bus 1302 or similar mechanism. The controller 1300 may be a microprocessor, digital ASIC, FPGA, or the like. In this example, the controller 1300 is a microprocessor, and the communication manager 120 is implemented in software and may be stored in the data store 123 for execution by the controller 1300. The I/O module 122 may be a local wireless interface such as a wireless interface operating according to one of the suite of IEEE 802.11 standards, a mobile communications interface such as a cellular telecommunications interface, or the like. The interface 118 may include, for example, a touchscreen, a display, one or more user input components (e.g., a keypad), a speaker, or the like, or any combination thereof.

In accordance with embodiments of the present disclosure, a communication request may be communicated to multiple devices associated with an intended recipient. For example, a server may receive a communication request identifying an intended recipient. User profile information associated with the identified recipient may identify multiple devices (e.g., home computer and mobile phone). The server may send the communication request to one or more of the devices identified in the user profile information of the intended recipient.

The various techniques described herein may be implemented with hardware or software or, where appropriate, with a combination of both. For example, the server 102 and the mobile computing devices 114 and 124 shown in FIG. 1 may include suitable hardware, software, or combinations thereof configured to implement the various techniques described herein. The methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:

at a computing device:

receiving a communication request for a subsequent communication with a recipient identified in the communication request, the communication request comprising a proposed timing for a subsequent communication, a proposed communication channel for the subsequent communication, and a conditional parameter for notifying the recipient of the communication request;

determining a condition of the recipient meets the conditional parameter of the communication request;

in response to determining the condition of the recipient device meets the conditional parameter of the communication request:

communicating the communication request for the subsequent communication to the recipient device identified in the communication request;

receiving, from the recipient, a selection of at least one of an actual timing and an actual communication channel for the subsequent communication;

initiating the subsequent communication with the recipient based on the selection;

determining a condition of the recipient does not meet the conditional parameter of the communication request within a predefined period of time; and in response to determining the condition of the recipient does not meet the conditional parameter of the communication request within a predefined period of time, cancelling the communication request.

2. The method of claim 1, wherein receiving the communication request comprises receiving indication of a proposed time period for the subsequent communication.

3. The method of claim 2, wherein initiating the subsequent communication comprises automatically initiating the subsequent communication prior to expiration of the proposed time period.

4. The method of claim 1, wherein initiating the subsequent communication comprises automatically initiating the subsequent communication with a requester of the communication based on a status of a device receiving the subsequent communication request.

5. The method of claim 4, further comprising determining the status of the device based on one or more of user inputs into a device receiving the communication request, an application running on the device receiving the communication request, and a location of the device receiving the communication request.

6. The method of claim 1, wherein receiving the communication request comprises receiving an indication of one or more proposed communication channels for the subsequent communication.

7. The method of claim 1, wherein receiving the communication request comprises receiving an indication of one or more of a call, text message, instant message, and social network communication.

8. The method of claim 1, further comprising, in response to receiving the communication request, automatically communicating a response message to an originator of the communication request.

9. The method of claim 8, wherein the response message specifies at least one parameter for the subsequent communication.

10. The method of claim 1, wherein receiving, from the recipient device, the selection comprises receiving user input for selecting at least one predefined parameter for the subsequent communication.

11. The method of claim 10, wherein the method further comprises communicating a response message to an originator of the communication request that specifies the at least one predefined parameter.

12. The method of claim 1, further comprising automatically determining at least one parameter for the subsequent communication.

13. The method of claim 12, wherein the method further comprises communicating a response message to an originator of the communication request that specifies the at least one parameter.

14. The method of claim 1, further comprising determining an activity of the recipient of the communication request,
wherein initiating the subsequent communication comprises initiating the subsequent communication based on the activity of the recipient.

15. The method of claim 14, wherein determining the activity of the recipient comprises determining an availability of the recipient for the subsequent communication, and
wherein the method further comprises notifying a requester of the communication request that the recipient is unavailable for the subsequent communication in response to receiving the communication request and determining that the recipient is unavailable for the subsequent communication.

16. The method of claim 14, further comprising receiving user input specifying the availability of the recipient,
wherein determining the availability of the recipient comprises determining the availability of the recipient for the subsequent communication based on the user input.

17. The method of claim 1, further comprising:
storing a predefined message for response to communication requests; and
in response to receiving the communication request, communicating the predefined message to a requester of the communication request.

18. The method of claim 17, further comprising determining that a computing device associated with recipient receiving the communication request is in a predetermined state,
wherein the predefined message is communicated responsive to the computing device associated with the recipient being in the predetermined state.

19. The method of claim 1, further comprising:
determining whether the subsequent communication is initiated within a predefined time interval; and
notifying a recipient of the communication request in response to determining that the subsequent communication is not initiated within the predefined time interval.

20. The method of claim 1, further comprising communicating with a requester of the communication request in accordance with the proposed timing and the proposed communication channel.

21. The method of claim 1, further comprising controlling a user interface to notify the recipient of the communication request.

22. The method of claim 1, wherein the communication request identifies an importance level for the subsequent communication, and
wherein the method further comprises controlling a user interface to notify the recipient of the importance level.

23. The method of claim 1, wherein the communication request identifies an aggressiveness level for the subsequent communication, and
wherein the method further comprises initiating the subsequent communication based on the aggressiveness level.

24. The method of claim 1, further comprising prioritizing initiation of the subsequent communication.

25. The method of claim 1, further comprising:
determining whether a recipient device meets a condition; and
in response to determining that the recipient device meets the condition, notifying a recipient of the communication request.

26. The method of claim 25, wherein one or more of the communication request and the recipient specifies the condition.

27. The method of claim 1, further comprising:
determining whether a recipient device meets a condition,
wherein initiating the communication comprises initiating the subsequent communication in response to determining that the recipient device meets the condition.

28. The method of claim 27, wherein one or more of the communication request and the recipient specifies the condition.

29. The method of claim 1, wherein the conditional parameter specifies the recipient is located at or near a specified location.

30. The method of claim 1, wherein the conditional parameter specifies the recipient is notified of the request during a specified time period.

31. The method of claim 1, wherein the conditional parameter specifies the recipient is notified of the request while the recipient device is not traveling.

32. A system comprising:
a server configured to communicate with a plurality of computing devices, the server comprising:
a communication interface configured to receive a communication request for a subsequent communication with a recipient identified in the communication request, the communication request comprising a proposed timing of a subsequent communication, a proposed communication channel for the subsequent communication, and a conditional parameter for notifying the recipient of the communication request;

a communication manager comprising a processor and memory, the communication manager configured to:
- determine a condition of the recipient meets the conditional parameter of the communication request;
- communicate the communication request for the subsequent communication to the recipient identified in the communication request in response to the determination the condition of the recipient meets the conditional parameter of the communication request;
- receive, in response to the reception of the communication request, selection of at least one of an actual timing and an actual communication channel for the subsequent communication;
- initiate the subsequent communication based on the selection;
- determine a condition of the recipient does not meet the conditional parameter of the communication request within a predefined period of time; and
- cancel the communication request in response to determining the condition of the recipient does not meet the conditional parameter of the communication request within a predefined period of time.

33. A non-transitory computer-readable storage medium having stored thereon computer executable instructions for performing the following steps:

receiving a communication request for a subsequent communication with a recipient identified in the communication request, the communication request comprising a proposed timing for a subsequent communication, a proposed communication channel for the subsequent communication, and a conditional parameter for notifying the recipient of the communication request;

determining a condition of the recipient meets the conditional parameter of the communication request;

in response to determining the condition of the recipient device meets the conditional parameter of the communication request:
- communicating the communication request for the subsequent communication to the recipient device identified in the communication request;
- receiving, from the recipient, a selection of at least one of an actual timing and an actual communication channel for the subsequent communication;
- initiating the subsequent communication with the recipient based on the selection;

determining a condition of the recipient does not meet the conditional parameter of the communication request within a predefined period of time; and in response to determining the condition of the recipient does not meet the conditional parameter of the communication request within a predefined period of time, cancelling the communication request.

* * * * *